US010583822B2

(12) United States Patent
Shibata et al.

(10) Patent No.: US 10,583,822 B2
(45) Date of Patent: Mar. 10, 2020

(54) CONTROL SYSTEM FOR VEHICLE

(71) Applicant: TOYOTA JIDOSHA KABUSHIKI KAISHA, Toyota-shi, Aichi-ken (JP)

(72) Inventors: Hiroyuki Shibata, Odawara (JP); Hiroyuki Shioiri, Yokohama (JP); Hideaki Komada, Gotemba (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 221 days.

(21) Appl. No.: 15/305,867

(22) PCT Filed: Apr. 20, 2015

(86) PCT No.: PCT/IB2015/000521

§ 371 (c)(1),
(2) Date: Oct. 21, 2016

(87) PCT Pub. No.: WO2015/162480

PCT Pub. Date: Oct. 29, 2015

(65) Prior Publication Data

US 2017/0050636 A1 Feb. 23, 2017

(30) Foreign Application Priority Data

Apr. 25, 2014 (JP) ................................ 2014-090868

(51) Int. Cl.

*B60W 10/02* (2006.01)
*F16D 48/06* (2006.01)

(Continued)

(52) U.S. Cl.

CPC ............ *B60W 10/02* (2013.01); *B60K 6/365* (2013.01); *B60K 6/383* (2013.01); *B60K 6/442* (2013.01);

(Continued)

(58) Field of Classification Search

CPC ..... B60Y 2300/424; F16D 2500/10493; F16D 48/06; B60W 10/02; B60W 10/08

See application file for complete search history.

(56) References Cited

U.S. PATENT DOCUMENTS 8,262,537 B2 * 9/2012 Yang ..................... B60K 6/365 477/5
9,783,192 B2 * 10/2017 Shibata ................. B60K 6/383

(Continued)

FOREIGN PATENT DOCUMENTS

JP 2001-287553 A 10/2001
JP 2010-071448 A 4/2010

(Continued)

*Primary Examiner* — Erin D Bishop

(74) *Attorney, Agent, or Firm* — Hunton Andrews Kurth LLP

(57) ABSTRACT

A control system for a vehicle, the control system includes a selectable one-way clutch, a motor, and an electronic control unit. The electronic control unit is configured to (i) execute rotation control to control the motor such that negative differential rotation changes into positive differential rotation when the selectable one-way clutch is switched from a disengaged state to an engaged state while differential rotation of the selectable one-way clutch is negative and (ii) initiate engagement control by a switching mechanism such that a projecting operation of the selectable one-way clutch is completed while the differential rotation is negative.

8 Claims, 11 Drawing Sheets

(51) Int. Cl.

| | |
|---|---|
| ***B60K 6/365*** | (2007.10) |
| ***B60K 6/383*** | (2007.10) |
| ***B60K 6/442*** | (2007.10) |
| ***B60W 10/08*** | (2006.01) |
| ***B60W 30/188*** | (2012.01) |
| ***F16H 3/72*** | (2006.01) |

(52) U.S. Cl.
CPC .......... *B60W 10/08* (2013.01); *B60W 30/188* (2013.01); *F16D 48/06* (2013.01); *F16H 3/724* (2013.01); *B60W 2710/021* (2013.01); *B60W 2710/081* (2013.01); *B60Y 2200/92* (2013.01); *B60Y 2300/424* (2013.01); *F16D 2500/10412* (2013.01); *F16D 2500/10493* (2013.01); *F16D 2500/30406* (2013.01); *F16D 2500/30415* (2013.01); *F16D 2500/30426* (2013.01); *F16D 2500/70426* (2013.01); *F16D 2500/70454* (2013.01); *Y10S 903/91* (2013.01); *Y10S 903/913* (2013.01); *Y10S 903/946* (2013.01)

(56) References Cited

U.S. PATENT DOCUMENTS

| | | | | |
|---|---|---|---|---|
| 9,884,614 | B2 * | 2/2018 | Shibata | B60K 6/383 |
| 9,951,829 | B2 * | 4/2018 | Shibata | F16D 48/06 |
| 2001/0029220 | A1 | 10/2001 | Kato | |
| 2008/0223681 | A1 | 9/2008 | Stevenson et al. | |
| 2009/0084653 | A1 | 4/2009 | Holmes | |
| 2009/0098970 | A1 | 4/2009 | Kimes | |
| 2011/0220428 | A1 | 9/2011 | Ando | |
| 2013/0062151 | A1 | 3/2013 | Pawley | |
| 2014/0188358 | A1 | 7/2014 | Joeng | |

FOREIGN PATENT DOCUMENTS

| | | | |
|---|---|---|---|
| JP | 2011-501054 | A | 1/2011 |
| JP | 2011-183947 | A | 9/2011 |
| JP | 2015-189324 | A | 11/2015 |
| JP | 2015-209053 | A | 11/2015 |
| JP | 2015-209882 | A | 11/2015 |
| KR | 20140086685 | A | 7/2014 |
| WO | 2015/145246 | A2 | 10/2015 |
| WO | 2015/162484 | A1 | 10/2015 |
| WO | 2015/162487 | A1 | 10/2015 |

* cited by examiner

CONTROL SYSTEM FOR VEHICLE

CROSS-REFERENCE TO RELATED APPLICATIONS

This is a national phase application based on the PCT International Patent Application No. PCT/IB2015/000521 filed Apr. 20, 2015, claiming priority to Japanese Patent Application No. 2014-090868 filed Apr. 25, 2014, the entire contents of both of which are incorporated herein by reference.

BACKGROUND OF THE INVENTION

1. Field of the Invention

The invention relates to a device for controlling a mechanism that transmits power for a travel of a vehicle. Particularly, the invention relates to a control system for a vehicle that includes a selectable one-way clutch.

2. Description of Related Art

The invention related to a vehicular transmission that includes a selectable one-way clutch (hereinafter described as an SOWC) is described in US 2009/0084653 A. The SOWC described in this US 2009/0084653 A includes: a first ring and a second ring that are arranged to face each other; and a strut that is arranged between these first ring and second ring. The first ring has a pocket which a tip of the strut enters and is engaged with. The second ring has a through opening. The strut is housed in the through opening. The strut is configured to be pushed out to the pocket side by a projecting tooth of an apply ring via a spring, the projecting tooth of the apply ring being inserted in the through opening from a back surface side of the second ring (an opposite side of a surface that faces the first ring). A combination of the strut and the pocket is provided in two types. In one type, the strut and the pocket are engaged when the SOWC transmits torque in a forward travel direction. In the other type, the strut and the pocket are engaged when the SOWC transmits the torque in a reverse travel direction. A blocking device is arranged between the first ring and the second ring in a manner to rotate within a specified angle range. The blocking device is a ring-shaped plate like the first ring and the second ring. This blocking device has a window through which the strut passes. In addition, a return mechanism that presses the blocking device in a direction to separate the blocking device from the first ring is provided between the blocking device and the first ring. Then, the above apply ring is configured to be moved by an actuator in a rotational axis direction. Accordingly, it is configured that the second ring and the blocking device are pressed to the first ring side via the apply ring and the projecting tooth by pressing the apply ring to the first ring side by thrust of the actuator.

In a disengaged state in which the above SOWC is not engaged in any of rotational directions of the forward travel direction and the reverse travel direction, the strut is pressed in the through opening of the second ring by the blocking device. In other words, the first ring is completely separated from the blocking device and the second ring. In the case where the actuator is actuated in such a disengaged state to press the second ring and the blocking device to the first ring side, the blocking device is brought into contact with an opposing surface of the first ring. The blocking device that is in contact with the first ring rotates in a rotational direction of the first ring by a friction force that is generated at this time. Then, when a position of the window of the blocking device matches a position of the through opening of the second ring (that is, the strut) in the rotational direction, the strut is pushed out from the window to the first ring side. As a result, the tip of the strut is engaged with the pocket that is formed in the first ring. In other words, the SOWC is switched to an engaged state.

Noted that the invention related to an SOWC that is constructed with: a strut; a notch plate that is formed with a notch, the notch being engaged with the strut; a pocket plate that is formed with a recessed section for housing the strut; a control plate that is formed with an opening through which the strut passes and that controls an engaged state between the strut and the notch is described in US 2013/0062151 A.

In the SOWC described in US 2009/0084653 A above, when the SOWC is switched from a disengaged state (MODE 1) to an engaged state (MODE 2), the SOWC is controlled such that a negative difference (differential rotation) is once produced between a rotational speed of the first plate and a rotational speed of the second plate. Thereafter, the SOWC is controlled such that the differential rotation becomes positive. The SOWC is configured to be switched from the disengaged state to the engaged state in a state that the differential rotation has actually become positive. More specifically, the SOWC is controlled such that the differential rotation, which has once become negative, is reversed to the positive side and then increased. At a point of time when the differential rotation becomes zero, the actuator starts being actuated. With actuation of the actuator, the blocking device is brought into contact with the first ring for rotation, and then the position of the window of the blocking device matches the position of the through opening of the second ring. Accordingly, a state that the strut can be projected from the window of the blocking device is generated. In other words, a state that the strut can be engaged with the pocket is generated. Then, once the differential rotation is increased to specified differential rotation on the positive side, the strut is operated to be projected from the window of the blocking device. The tip of the strut is then engaged with the pocket of the first ring, and thus the SOWC is switched to the engaged state. Noted that, in this SOWC, a state of the positive differential rotation corresponds to a direction in which the strut and the pocket are engaged. That is, this state corresponds to a rotational state in which the torque can be transmitted between the first ring and the second ring in this SOWC. In this SOWC, a state of the negative differential rotation corresponds to a direction in which the strut and the pocket are not engaged. That is, this state corresponds to a rotational state in which the torque is not transmitted between the first ring and the second ring in this SOWC.

As described above, in the SOWC described in US 2009/0084653 A, the strut and the pocket are engaged when the differential rotation is positive. In addition, as described above, the SOWC can transmit torque when the differential rotation is positive. Accordingly, there is a case where a load is applied to the strut, which is pressed to the pocket side, immediately after the strut enters the pocket. Regarding this problem, in this SOWC described in US 2009/0084653 A, the blocking device for controlling an operation of the strut is indirectly operated, that is, operated by following an operation of any other component of the SOWC. In other words, the SOWC is not configured that the operation of the blocking device is actively controlled. For this reason, in this SOWC described in US 2009/0084653 A, there is a case where an excessive load or impact force is applied to the strut immediately after the strut enters the pocket. Alternatively, there is a case where the strut and the pocket are engaged at an improper position that is located in a middle of a path for the strut to be engaged at a specified position in the pocket. If the strut is engaged at such an improper position, an area of a contact portion between the strut and the pocket is reduced, and thus surface pressure of the contact portion is increased. Accordingly, durability of the SOWC described in US 2009/0084653 A is possibly degraded due to application of the excessive load or impact force to the strut or due to an increase in the surface pressure that acts on the strut.

SUMMARY OF THE INVENTION

The invention provides a control device for a vehicular power transmission mechanism with which a selectable one-way clutch can appropriately and reliably be engaged.

A first aspect of the invention is a control system for a vehicle. The control system includes a selectable one-way clutch, a motor, and an electronic control unit. The selectable one-way clutch includes a first clutch member, a second clutch member, a strut, and a switching mechanism. The first clutch member and the second clutch member are configured to make relative rotation to each other. The strut is configured to be operated such that a part of the strut projects from the first clutch member to the second clutch member. The switching mechanism is configured to selectively set a first state or a second state. The first state is a state in which a projecting operation is permitted. The projecting operation is an operation that the part of the strut projects from the first clutch member to the second clutch member. The second state is a state in which the projecting operation is inhibited. The selectable one-way clutch is configured to be switched between an engaged state and a disengaged state. The engaged state is a state in which the relative rotation in only one of a positive rotational direction and a reverse rotational direction of the selectable one-way clutch is restricted with the first state in which the part of the strut projects from the first clutch member to the second clutch member and the part of the strut engages with a part of the second clutch member. The disengaged state is a state in which the relative rotations in both of the positive rotational direction and the reverse rotational direction of the selectable one-way clutch are permitted with the second state in which the operation of the part of the strut to be projected from the first clutch member to the second clutch member is inhibited. The motor is configured to control a rotational speed of one of the first member and the second member. The selectable one-way clutch is configured such that differential rotation occurs by controlling the rotational speed by the motor. The differential rotation includes positive differential rotation and negative differential rotation. The positive differential rotation is a relative rotation in a direction in which the relative rotation is restricted when the selectable one-way clutch is in the engaged state. The negative differential rotation is a relative rotation in a direction in which the relative rotation is permitted when the selectable one-way clutch is in the engaged state. The electronic control unit is configured to: (i) execute rotation control to control the motor such that the negative differential rotation changes into the positive differential rotation when the selectable one-way clutch is switched from the disengaged state to the engaged state while the differential rotation is negative; and (ii) initiate engagement control to set the first state by the switching mechanism such that the projecting operation is completed while the differential rotation is negative.

According to the above aspect, in the case where the selectable one-way clutch, of which differential rotation is negative, is switched from the disengaged state to the engaged state, rotation of the motor is controlled such that the differential rotation of the selectable one-way clutch is increased to the positive side. In conjunction with this, the switching mechanism is actuated such that the operation of the strut to be projected to an engagement position on the second clutch member side is completed in the first state before the differential rotation becomes the positive differential rotation, that is, while the differential rotation is negative. In this case, timing at which the actuation of the switching mechanism is initiated, that is, initiation timing of the engagement control is determined in consideration of an actuation time period of the switching mechanism or time required for the strut to be operated, for example. In this way, the projecting operation of the strut as described above can easily be completed while the differential rotation is negative. Torque can be transmitted between the two clutch members when the differential rotation is positive. Thus, a load is possibly applied to the strut. On the contrary, the torque is not transmitted between the two clutch members when the differential rotation is negative. Thus, the load is not applied to the strut, and the strut can easily be operated. Accordingly, the projecting operation of the strut can easily be completed by setting the first state while the differential rotation is negative. As a result, the strut can reliably be engaged at a specified position without being applied with the excessive load or an impact force. Therefore, the selectable one-way clutch in the disengaged state can appropriately be switched to the engaged state.

In the above aspect, a first target differential rotation may be set as a target value of the differential rotation at a point of time when the projecting operation is completed in the case where the engagement control is executed. Second target differential rotation may be set as a threshold of the differential rotation for determining the initiation timing of the engagement control such that the projecting operation is completed when the differential rotation reaches the first target differential rotation. The electronic control unit may be configured to initiate the engagement control when the differential rotation is equal to or higher than the second target differential rotation on the positive side.

According to the above aspect, in the case where the projecting operation of the strut is completed while the differential rotation of the selectable one-way clutch is the negative differential rotation as described above, the first target differential rotation and the second target differential rotation are respectively set as the target value and the threshold that are used when the differential rotation of the selectable one-way clutch is controlled. Then, at the point of time when the differential rotation that is increased to the positive side by the rotation control reaches the second target differential rotation, the engagement control is initiated such that the projecting operation of the strut is completed when the differential rotation reaches the first target differential rotation. In this case, the first target differential rotation and the second target differential rotation are set in consideration of the actuation time period of the switching mechanism and the time required for the strut to be operated, for example. Thus, the projecting operation of the strut as described above can reliably be completed while the differential rotation is negative. Therefore, the selectable one-way clutch in the disengaged state can appropriately and reliably be switched to the engaged state.

In the above aspect, the electronic control unit may be configured to control the motor such that a speed change of the differential rotation in the rotation control reduces when current differential rotation is higher than the second target differential rotation on the positive side.

According to the above aspect, upon setting of the first target differential rotation and the second target differential rotation as described above and executing the rotation control and the engagement control, in the case where the differential rotation of the selectable one-way clutch exceeds the second target differential rotation on the positive side, the speed change of the differential rotation in the rotation control is reduced. As a result, time required for the differential rotation to later reach the first target differential rotation is extended, and thus additional time is provided to complete the projecting operation of the strut before the differential rotation reaches the first target differential rotation. For this reason, the projecting operation of the strut as described above can reliably be completed while the differential rotation is negative.

In the above aspect, the electronic control unit may be configured to control the motor such that the speed change of the differential rotation in the rotation control reduces when the projecting operation is not completed while the differential rotation reaches the first target differential rotation during execution of the rotation control and the engagement control.

According to the above aspect, upon setting of the first target differential rotation and the second target differential rotation as described above and executing the rotation control and the engagement control, in the case where the projecting operation of the strut is not completed when the differential rotation of the selectable one-way clutch reaches the first target differential rotation, the speed of change of the differential rotation in the rotation control is reduced. As a result, the time required for the differential rotation to later become zero and be further shifted to the positive side is extended, and thus the additional time is provided to complete the projecting operation of the strut while the differential rotation is negative. Noted that, in the case where the speed of change of the differential rotation is reduced as described above, it may also be controlled such that the speed of change of the differential rotation is set to zero or substantially zero and that the differential rotation is substantially maintained at the first target differential rotation until the projecting operation of the strut is completed. Thus, according to the above aspect, the projecting operation of the strut as described above can reliably be completed while the differential rotation is negative.

In the above aspect, in the case where the electronic control unit makes an engagement determination to switch the selectable one-way clutch from the disengaged state to the engaged state, the electronic control unit may be configured to initiate the engagement control after the electronic control unit makes the engagement determination.

According to the above aspect, in the case where the selectable one-way clutch, of which differential rotation is negative, is switched from the disengaged state to the engaged state, the engagement control of the switching mechanism is initiated in conjunction with the engagement determination of the selectable one-way clutch. Accordingly, the projecting operation of the strut can be completed as soon as possible. Therefore, the selectable one-way clutch in the disengaged state can appropriately be switched to the engaged state. In addition, responsiveness of the control can be improved by reducing the time required for switching of the engagement state.

In the above aspect, a first target differential rotation may be set as the target value of the differential rotation at the point of time when the projecting operation is completed in the case where the engagement control is executed. The electronic control unit is configured to control the motor such that the speed of change of the differential rotation in the rotation control reduces when the projecting operation is not completed while the differential rotation reaches the first target differential rotation during the execution of the rotation control and the engagement control.

According to the above aspect, in the case where the projecting operation of the strut is completed while the differential rotation of the selectable one-way clutch is the negative differential rotation as described above, the first target differential rotation is set as the target value that is used when the differential rotation of the selectable one-way clutch is controlled. In addition, the engagement control and the rotation control are executed such that the engagement control of the switching mechanism is immediately initiated in conjunction with the engagement determination of the selectable one-way clutch and that the projecting operation of the strut is completed when the differential rotation reaches the first target differential rotation. Then, upon the setting of the first target differential rotation as described above and the execution of the rotation control and the engagement control, in the case where the projecting operation of the strut is not completed when the differential rotation of the selectable one-way clutch reaches the first target differential rotation, the speed of change of the differential rotation in the rotation control is reduced. As a result, the time required for the differential rotation to later become zero and be further shifted to the positive side is extended, and thus the additional time is provided to complete the projecting operation of the strut while the differential rotation is negative. Noted that, in the case where the speed of change of the differential rotation is reduced as described above, it may be controlled such that the speed of change of the differential rotation is set to zero or substantially zero and that the differential rotation is substantially maintained at the first target differential rotation until the projecting operation of the strut is completed. Thus, according to the above aspect, the projecting operation of the strut as described above can reliably be completed while the differential rotation is negative.

In the above aspect, the vehicle may have an internal combustion engine and the power transmission mechanism. The power transmission mechanism may have a fixed section and a first differential mechanism. One of the first clutch member and the second clutch member may be coupled to the fixed section. The fixed section may be configured not to rotate or move. The first differential mechanism may have a first rotary element, a second rotary element, and a third rotary element. The first rotary element, the second rotary element, and the third rotary element may be configured to perform a differential action with respect to each other. The internal combustion engine may be coupled to the first rotary element. The motor and the other one of the first clutch member and the second clutch member may be coupled to the second rotary element. The first differential mechanism may be configured to output torque from the third rotary element.

In the above aspect, the vehicle may have the internal combustion engine and the power transmission mechanism. The power transmission mechanism may have the fixed section, the first differential mechanism, and a second differential mechanism. One of the first clutch member and the second clutch member may be coupled to the fixed section. The fixed section may be configured not to rotate or move. The first differential mechanism may have the first rotary element, the second rotary element, and the third rotary element. The first rotary element, the second rotary element, and the third rotary element may be configured to perform the differential action with respect to each other. The internal combustion engine may be coupled to the first rotary element. The motor may be coupled to the second rotary element. The first differential mechanism may be configured to output torque from the third rotary element. The second differential mechanism may have a fourth rotary element, a fifth rotary element, and a sixth rotary element. The fourth rotary element, the fifth rotary element, and the sixth rotary element may be configured to perform the differential action with respect to each other. The first rotary element may be coupled to the fourth rotary element. The second rotary element may be coupled to the fifth rotary element. The other one of the first clutch member and the second clutch member may be coupled to the sixth rotary element. The fifth rotary element may be configured to rotate in an opposite direction from the fourth rotary element when the rotation of the sixth rotary element is stopped.

The above aspect can be applied to the control device for the power transmission mechanism in which a speed of the internal combustion engine can be controlled by the motor via the differential mechanism. In this case, the selectable one-way clutch can selectively restrict rotation of any of the rotary elements of the differential mechanism in a specified direction. Then, the selectable one-way clutch can reliably and appropriately be switched from the disengaged state to the engaged state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7B is executed;

DETAILED DESCRIPTION OF EMBODIMENTS

Figure 1:
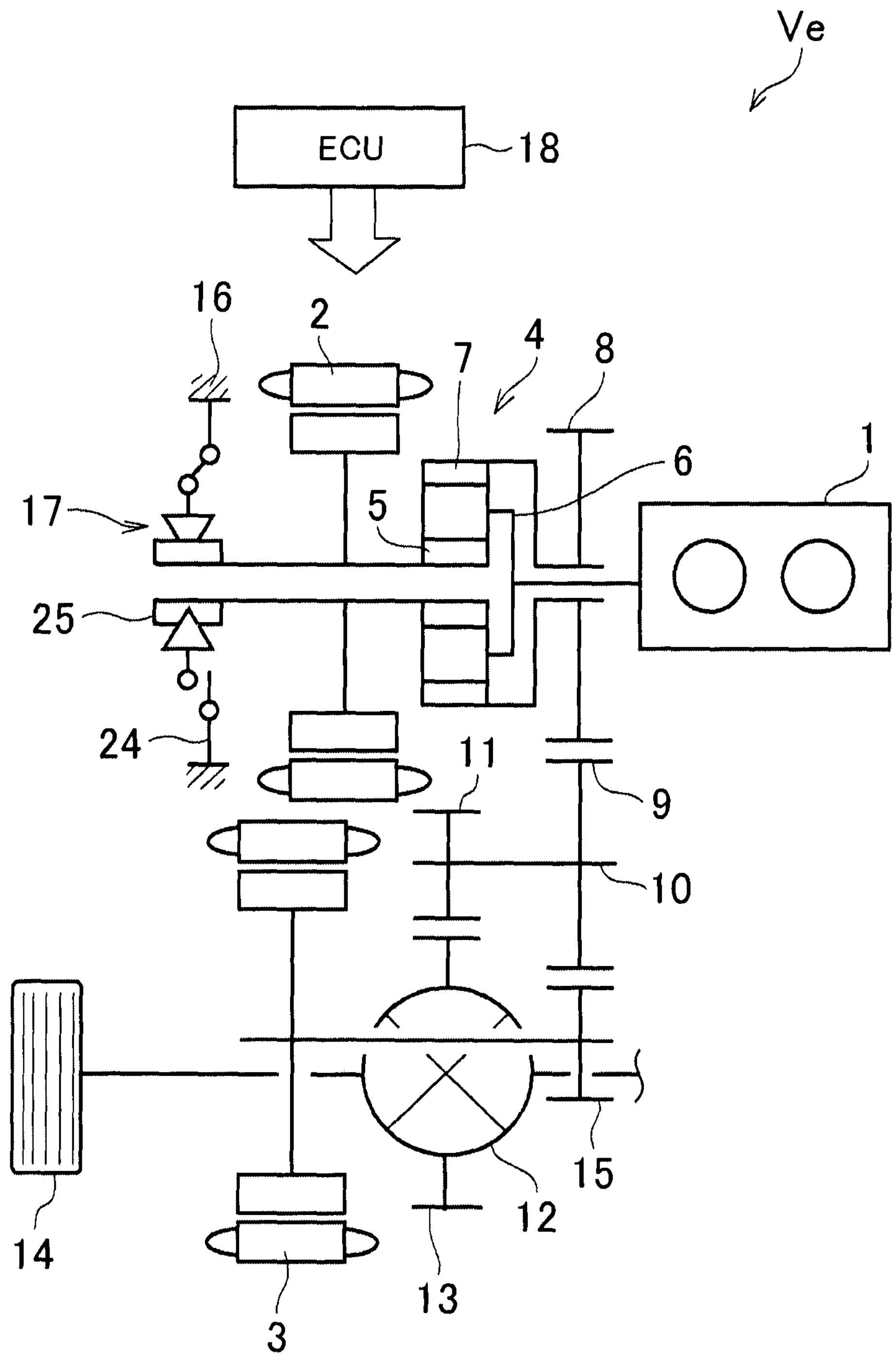
FIG. 1 is a view of an example of a configuration of a power transmission mechanism in a hybrid vehicle to which the invention is applied.

Next, a specific description will be made on the invention with reference to the drawings. The invention can be applied to a control device of which a power transmission mechanism in a hybrid vehicle is a subject. First, an example of a configuration of the power transmission mechanism will be described. FIG. 1 schematically shows the power transmission mechanism in a hybrid vehicle Ve of double-spindle two-motor type. The hybrid vehicle Ve includes: an engine (Eng) 1 as an example of an internal combustion engine of the invention; a first motor (MG1) 2 an example of a motor of the invention; and a second motor (MG2) 3 as drive power sources.

The first motor 2 is configured to mainly execute control of a speed of the engine 1 and cranking of the engine 1. This first motor 2 is also configured to function as one of the drive power sources in a two-motor travel mode (a two-motor EV mode) in which a vehicle travels by the two motors. Together with the engine 1, the first motor 2 is coupled to a power split mechanism 4 that is an example of the first differential mechanism of the invention.

In this example shown in FIG. 1, the power split mechanism 4 is constructed of a planetary gear mechanism of single pinion type that includes a sun gear 5, a carrier 6, and a ring gear 7 as rotary elements. A rotor of the first motor 2 is coupled to the sun gear 5 that is an example of a second rotary element of the invention among the rotary elements. In addition, an output shaft (a crankshaft) of the engine 1 is coupled to the carrier 6 that is an example of a first rotary element of the invention. The ring gear 7 that is an example of a third rotary element of the invention is an output element. An output gear 8 as an output member is attached to the ring gear 7. The output gear 8 meshes with a counter driven gear 9. The counter driven gear 9 is attached to a counter shaft 10. A counter drive gear 11 that has a smaller diameter than the counter driven gear 9 is attached to the counter shaft 10. The counter drive gear 11 meshes with a ring gear 13 in a differential gear 12. Then, the differential gear 12 outputs drive torque to right and left drive wheels 14.

The second motor 3 is configured to mainly function as a drive power source for a travel. A drive gear 15 is attached to a rotor shaft of the second motor 3. The drive gear 15 meshes with the counter driven gear 9. This drive gear 15 has a smaller diameter than the counter driven gear 9. In this manner, the drive gear 15 and the counter driven gear 9 constitute a speed reduction mechanism.

A selectable one-way clutch (hereinafter described as an SOWC) 17 is provided between the sun gear 5, to which the first motor 2 is coupled, and a casing 16 that is an example of a fixed section of the invention. This SOWC 17 is a clutch that is configured to enable relative rotation in both directions of positive rotation and reverse rotation so as to prevent torque transmission in a disengaged state. This SOWC 17 is also a clutch that is configured to restrict the relative rotation in only one direction of the positive rotation and the reverse rotation so as to transmit the torque in the direction of the relative rotation and to enable the relative rotation in the other direction of the positive rotation and the reverse rotation so as to prevent the torque transmission in an engaged state. Here, the positive rotation refers to rotation in the same direction as a rotational direction of the engine 1. The reverse rotation (or negative rotation) refers to rotation in an opposite direction from the rotational direction of the engine 1. In addition, similar to the SOWC described in above-described US 2009/0084653 A, this SOWC 17 can transmit the torque when a difference in the rotational speed (differential rotation) between the two members that are involved in torque transmission is positive. The SOWC 17 is configured not to transmit the torque when the differential rotation is negative. Here, "between the two members" refers to "between a first clutch plate 24 and a second clutch plate 25", which will be described below. Noted that the specific configuration of this SOWC 17 will be described below.

The first motor 2 and the second motor 3 are connected to an electrical storage device and a controller unit such as an inverter, which are not shown. In addition, the motors 2, 3 are electrically connected to each other to enable electrical power transfer therebetween. Furthermore, an electronic control unit (ECU) 18 is provided to control these electrical storage device and controller unit, the SOWC 17, or the like. This electronic control unit 18 is constructed of a microcomputer as a main body. This electronic control unit 18 is configured to receive detection signals indicative of a vehicle speed, an accelerator operation amount, an engine speed, estimated output torque, a rotational speed and torque of each of the motors 2, 3, an operating state of the SOWC 17, and the like as data. In addition, this electronic control unit 18 is configured to output command signals for controlling each of the motors 2, 3 and the SOWC 17, the command signals being obtained by performing computation based on the input data.

Figure 2:
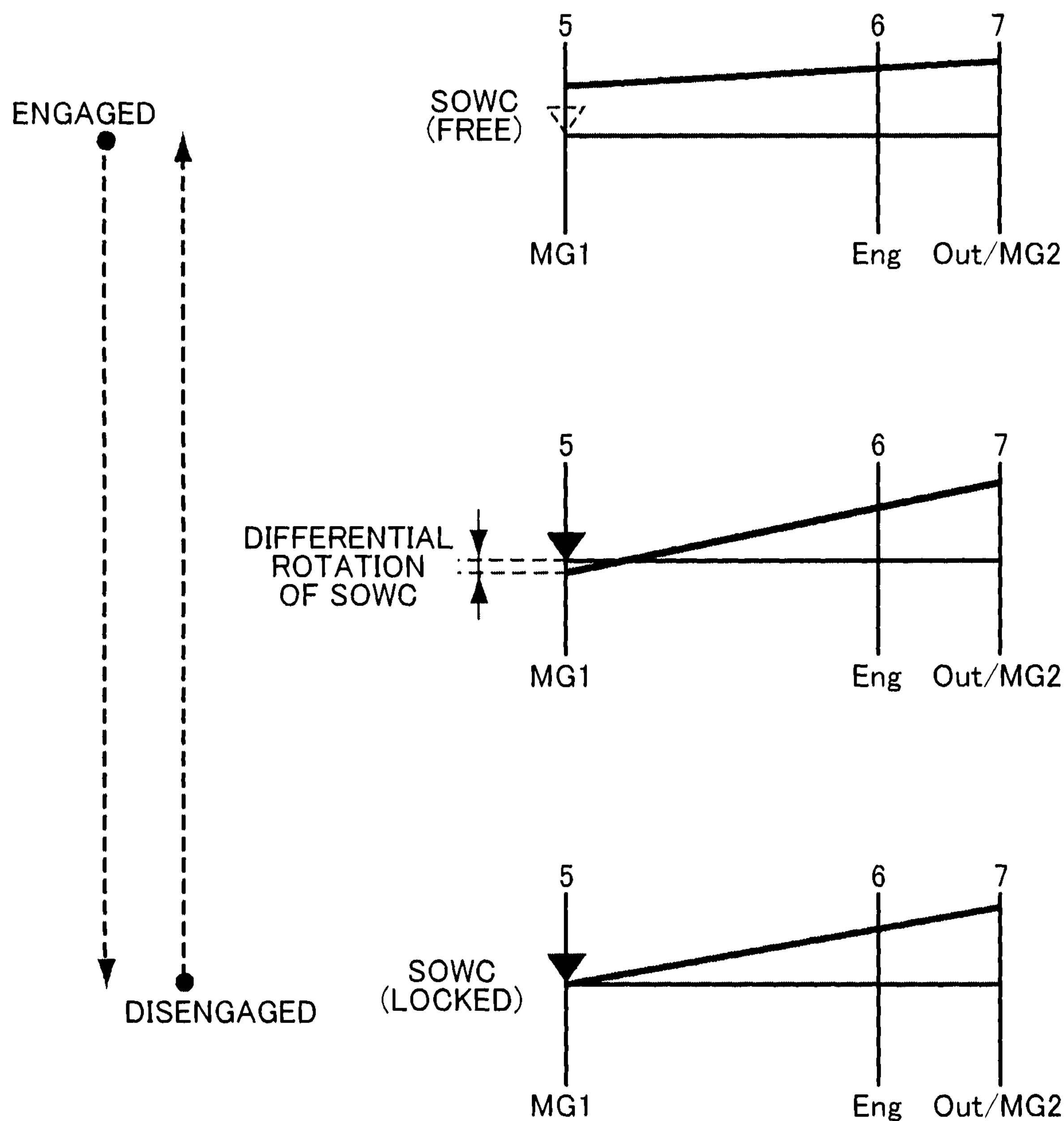
FIG. 2 includes collinear charts on a planetary gear mechanism that constitutes the power transmission mechanism in the hybrid vehicle shown in FIG. 1.

FIG. 2 includes collinear charts on the planetary gear mechanism that constitutes the above power split mechanism 4. A top diagram in FIG. 2 indicates a forward traveling state in a hybrid mode (an HV mode or a power split mode). In this state shown in the top diagram in FIG. 2, the engine 1 is driven, and thus the carrier 6 makes the positive rotation. In addition, due to the forward travel of the vehicle Ve, the ring gear 7 makes the positive rotation. At this time, the SOWC 17 is disengaged, and thus the sun gear 5 and the first motor 2, which is coupled to the sun gear 5, can rotate in either the positive rotation or the reverse rotation. In this state shown in the top diagram in FIG. 2, the first motor 2 functions as an electrical power generator while making the positive rotation. In other words, the first motor 2 outputs torque in a negative direction (a downward direction in the top diagram in FIG. 2) and thereby controls the speed of the engine 1 to a speed at which excellent fuel efficiency can be realized. In this case, the electrical power generated in the first motor 2 is supplied to the second motor 3. Then, the second motor 3 functions as the motor and outputs drive power for the travel.

A second diagram from the top in FIG. 2 indicates a transient state (a transition state) in which the SOWC 17 is switched between the state shown in the top diagram in FIG. 2 and a state shown in the third diagram from the top in FIG. 2, which will be described below. In other words, the second diagram from the top in FIG. 2 indicates a transient state when the SOWC 17 is switched from the disengaged state (free) to the engaged state (locked) in which the positive rotation of the sun gear 5 is stopped. In this state shown in the second diagram from the top in FIG. 2, the first motor 2 functions as the motor and rotates the sun gear 5 in a reverse rotational direction. As a result, the negative differential rotation is produced in the SOWC 17. In other words, the SOWC 17 does not transmit the torque. Thus, when the control for switching the SOWC 17 to the engaged state is executed in this state, torque is not applied to a strut of the SOWC 17, which will be described below.

A third diagram from the top in FIG. 2 indicates a state in which the positive rotation of the sun gear 5 is stopped by the SOWC 17 and in which the vehicle travels forward by the drive power of the engine 1 or by the drive power of the engine 1 and the drive power of the second motor 3 (in a so-called parallel mode). In this state shown in the third diagram from the top in FIG. 2, a rotational speed of the ring gear 7 is higher than the engine speed (a rotational speed of the carrier 6), and thus the torque is output from the ring gear 7. When the second motor 3 is operated as the motor in this state, the drive power thereof is added to the drive power that is output from the ring gear 7 and is transmitted to the drive wheels 14 via the differential gear 12. Also in this case, the first motor 2 and the sun gear 5 are fixed, and energization thereof is stopped (in an OFF state). Thus, the excellent fuel efficiency can be realized when the vehicle travels at a high speed.

Figure 3:
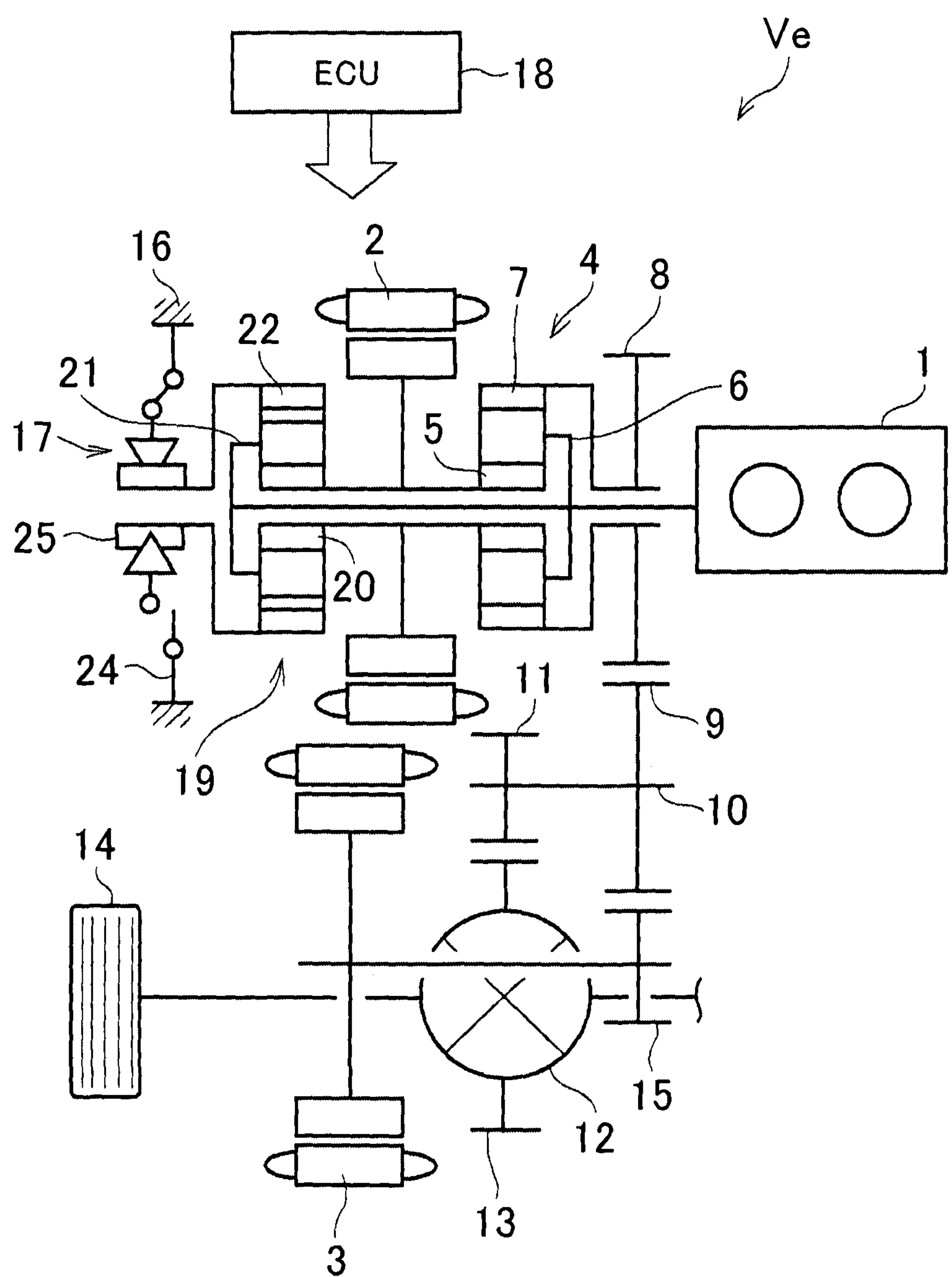
FIG. 3 is a view of another example of the configuration of the power transmission mechanism in the hybrid vehicle to which the invention is applied.

FIG. 3 shows another example of the configuration of the power transmission mechanism that can be the subject of the invention. This configuration shown in FIG. 3 is an example in which an overdrive (O/D) mechanism 19 is added to the above-described configuration shown in FIG. 1. This configuration shown in FIG. 3 is also an example in which the overdrive mechanism 19 is selectively locked by the SOWC 17. The overdrive mechanism 19 is an example of a second differential mechanism of the invention. In this example shown in FIG. 3, the overdrive mechanism 19 is constructed of a planetary gear mechanism of double pinion type that includes a sun gear 20, a carrier 21, and a ring gear 22 as rotary elements. The carrier 6 in the above-described power split mechanism 4 is coupled to the carrier 21 that is an example of a fourth rotary element of the invention. Accordingly, it is configured that the output torque of the engine 1 is transmitted to these carrier 6 and carrier 21. In addition, the sun gear 5 in the power split mechanism 4 is coupled to the sun gear 20 that is an example of a fifth rotary element of the invention. Accordingly, it is configured that the torque of the first motor 2 is transmitted to these sun gear 5 and sun gear 20. Furthermore, the above-described SOWC 17 is arranged between the casing 16 and the ring gear 22 that is an example of a sixth rotary element of the invention. It is configured that the SOWC 17 restricts (inhibits) rotation of the ring gear 22 in a specified direction, so as to set an overdrive state. The rotary elements of the planetary gear mechanism of the single pinion type that constitutes the power split mechanism 4 and the rotary elements of the planetary gear mechanism of the double pinion type that constitutes the overdrive mechanism 19 are coupled as described above. In this way, a so-called compound planetary gear mechanism having the four elements is constructed. Since the rest of the configuration of the power transmission mechanism is the same as the configuration shown in FIG. 1, components shown in this FIG. 3 are denoted by the same reference numerals as those used in FIG. 1, and the description thereof will not be made.

Figure 4:
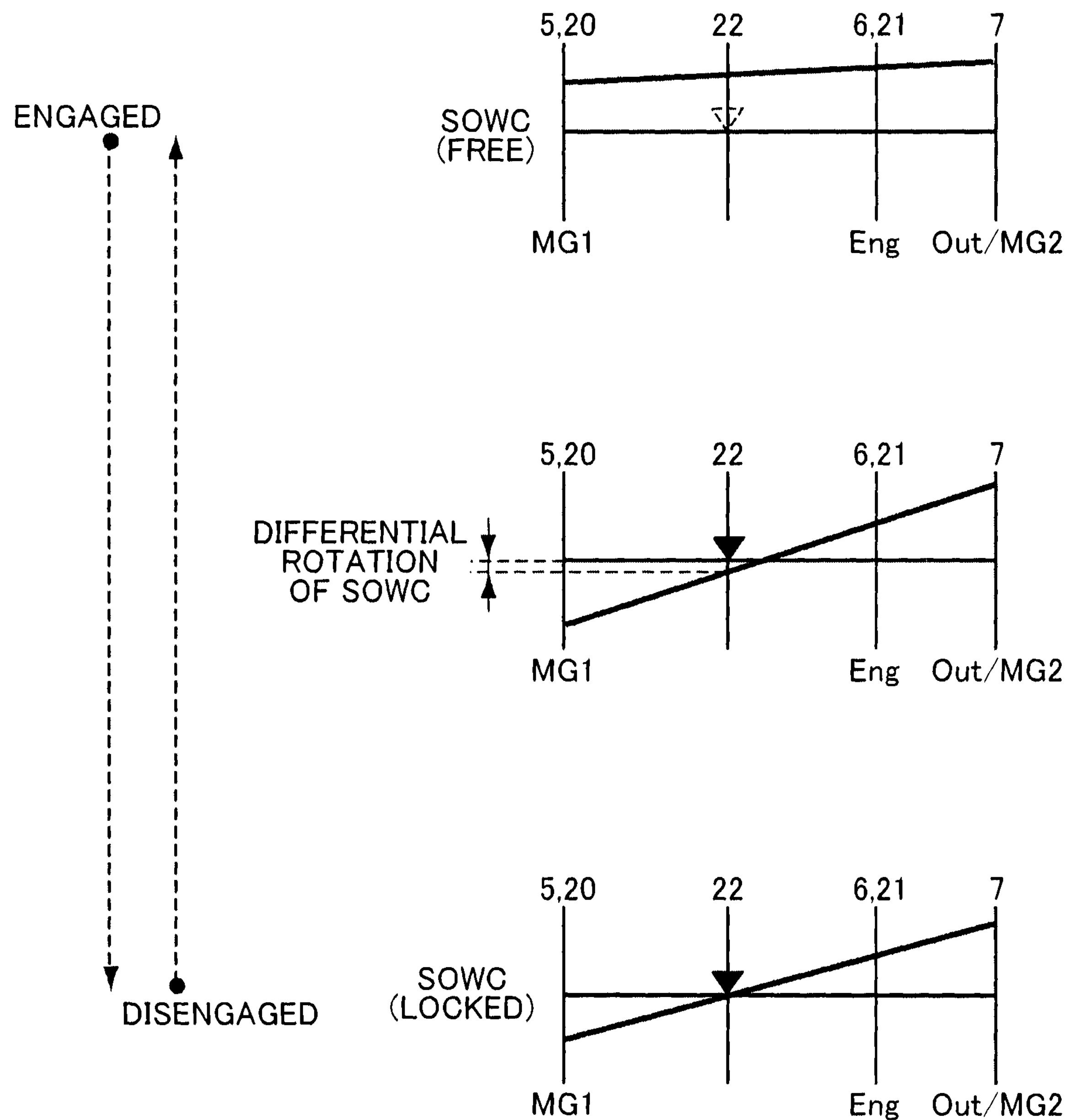
FIG. 4 includes collinear charts on a compound planetary gear mechanism that constitutes a power split mechanism and an overdrive mechanism in the hybrid vehicle shown in FIG. 3.

FIG. 4 includes collinear charts on the above compound planetary gear mechanism. A top diagram in FIG. 4 indicates the forward traveling state in the hybrid mode (the HV mode or the power split mode). In this state shown in the top diagram in FIG. 4, the engine 1 is driven. Thus, the carrier 6 makes the positive rotation. In addition, the vehicle Ve travels forward. Thus, the ring gear 7 makes the positive rotation. At this time, the SOWC 17 is disengaged, and thus the sun gear 5 or the ring gear 22, and the first motor 2, which can rotate the sun gear 5 and the ring gear 22, can rotate in either the positive rotation or the reverse rotation. In this state shown in the top diagram in FIG. 4, the first motor 2 functions as the electrical power generator while making the positive rotation. In other words, the first motor 2 outputs the torque in the negative direction (a downward direction in the top diagram in FIG. 4). In this way, the first motor 2 controls the speed of the engine 1 to the speed at which the excellent fuel efficiency can be realized. In this case, the electrical power generated in the first motor 2 is supplied to the second motor 3. Then, the second motor 3 functions as the motor and outputs the drive power for the travel.

A second diagram from the top in FIG. 4 indicates a transient state (a transition state) in which the SOWC 17 is switched between the state shown in the top diagram in FIG. 4 and a state shown in the third diagram from the top in FIG. 4, which will be described below. In other words, the second diagram from the top in FIG. 4 indicates a transient state when the SOWC 17 is switched from the disengaged state (free) to the engaged state (locked) in which the SOWC 17 stops the positive rotation of the ring gear 22. In this state shown in the second diagram from the top in FIG. 4, the first motor 2 functions as the motor and rotates the sun gear 5 or the ring gear 22 in the reverse rotational direction. The rotational speed at this time is the rotational speed at which the ring gear 22 makes the reverse rotation, and the negative differential rotation is produced in the SOWC 17. In other words, the SOWC 17 does not transmit the torque. Thus, when the control for switching the SOWC 17 to the engaged state is executed in this state, the torque is not applied to the strut of the SOWC 17, which will be described below.

A third diagram from the top in FIG. 4 indicates a state in which the positive rotation of the ring gear 22 is stopped by the SOWC 17 and the vehicle travels forward by the drive power of the engine 1. Alternatively, the third diagram from the top in FIG. 4 indicates a state in which the positive rotation of the ring gear 22 is stopped by the SOWC 17 and the vehicle travels forward by the drive power of the engine 1 and the drive power of the second motor 3. In this state shown in the third diagram from the top in this FIG. 4, the ring gear 22 in the overdrive mechanism 19 is fixed so as not to rotate in the positive rotational direction. Then, torque in the positive rotational direction is applied to the carrier 21. Accordingly, the sun gear 20 makes the reverse rotation. In the power split mechanism 4, the sun gear 5 is integrated with the sun gear 20 in the overdrive mechanism 19 and makes the reverse rotation. Accordingly, in the power split mechanism 4, since the torque of the engine 1 is applied to the carrier 6 in the state that the sun gear 5 makes the reverse rotation, the ring gear 7 as the output element rotates at the higher rotational speed than the carrier 6 (that is, the engine 1). In other words, the overdrive state is generated. When the second motor 3 is operated as the motor in this state, the drive power thereof is added to the drive power that is output from the ring gear 7 and is transmitted to the drive wheels 14 via the differential gear 12. Noted that, in this overdrive state, the first motor 2 is fixed with the ring gear 22 and controlled to be in the OFF state. Thus, the excellent fuel efficiency can be realized when the vehicle travels at the high speed.

Figure 5:
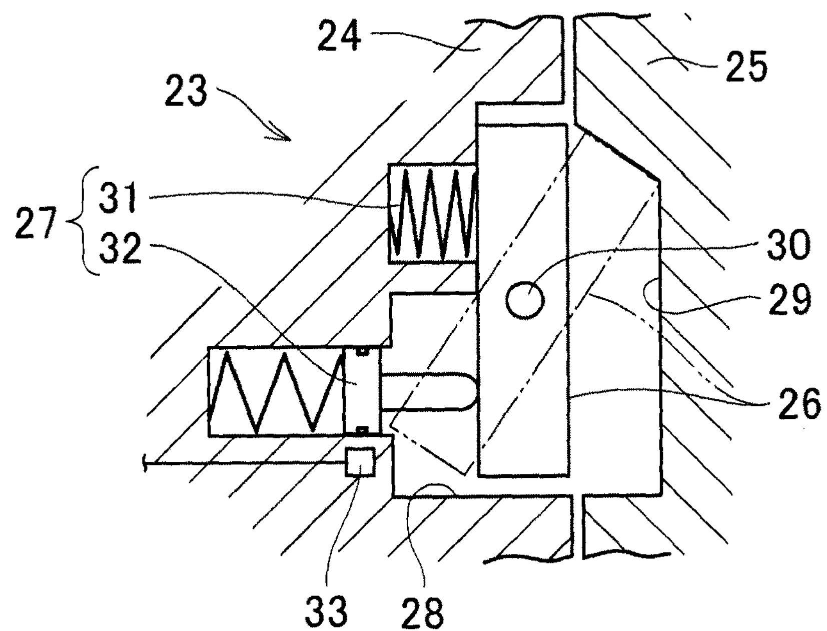
FIG. 5 is a cross-sectional view of a configuration of a selectable one-way clutch that can be a subject of the invention.
Figure 6:
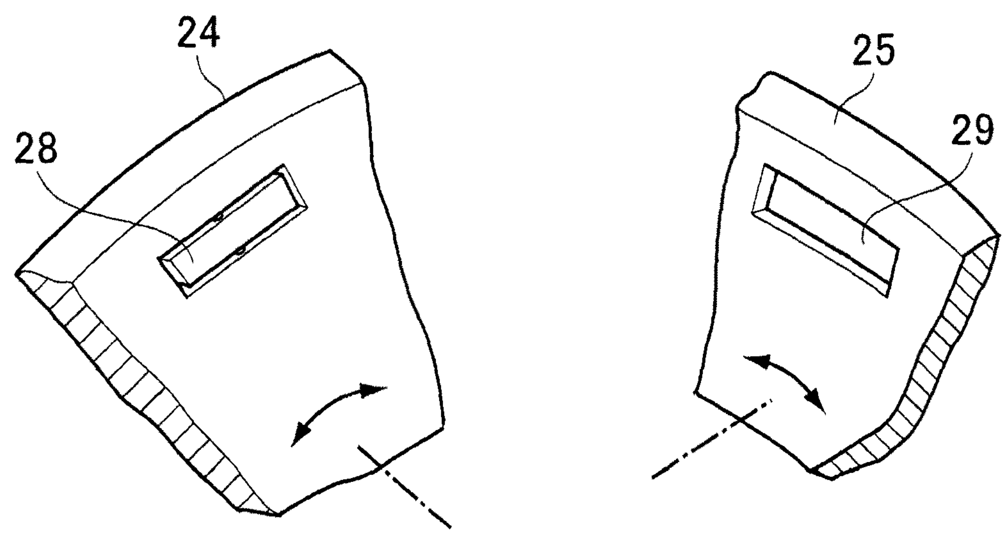
FIG. 6 is a view of a housing section and a pocket, the housing section being formed in a first clutch plate and the pocket being formed in a second clutch plate of the selectable one-way clutch shown in FIG. 5.

Here, the configuration of the SOWC 17 will be described. In the power transmission mechanism that is the subject of the invention, for example, the SOWC that is described in above-described US 2009/0084653 A, the SOWC that is described in above-described US 2013/0062151 A, an SOWC that is described in US 2010/0252384 A, or the like can be adopted. Furthermore, the SOWC 17 that is configured as shown in FIG. 5 and FIG. 6 can be adopted. These FIG. 5 and FIG. 6 show an engagement mechanism 23 in the SOWC 17. This engagement mechanism 23 is mainly constructed of the first clutch plate 24, the second clutch plate 25, a strut 26, and an actuation mechanism 27.

The first clutch plate 24 is formed in a disc shape as a whole. The second clutch plate 25 that is also formed in the disc shape as the first clutch plate 24 is arranged to face this first clutch plate 24. Of these clutch plates 24, 25, the first clutch plate 24 is an example of a first clutch member of the invention. Of these clutch plates 24, 25, the second clutch plate 25 is an example of a second clutch member of the invention. These clutch plates 24, 25 are retained to enable relative rotation to each other. For example, the one clutch plate 24 (25) is attached to the above-described casing 16. The other clutch plate 25 (24) is coupled to the sun gear 5 in the example shown in FIG. 1. Alternatively, in the example shown in FIG. 3, the other clutch plate 25 (24) is coupled to the ring gear 22.

The first clutch plate 24 is formed with a recessed section that is elongated in a rotational direction at a position that is in a front surface of the first clutch plate 24 and that is shifted to a radially outer side from the center of rotation of the first clutch plate 24. This position is, in other words, a specified position on an outer peripheral side of the first clutch plate 24. This recessed section is a housing section 28 for housing the strut 26. The second clutch plate 25 is formed with a pocket 29 that is a recessed section in the substantially same shape as the housing section 28 at a radial position that is in a surface of the second clutch plate 25 facing the first clutch plate 24 and that corresponds to the housing section 28. A plate-shaped engagement piece whose cross section is substantially the same as that of the housing section 28, that is, the strut 26 is housed in the housing section 28. The strut 26 is arranged in the housing section 28 in a manner to swing with a support pin 30 being the center, the support pin 30 being provided at the center in a longitudinal direction of the strut 26 and facing the radial direction of the first clutch plate 24. A depth of the recessed section of the housing section 28 is changed at the support pin 30. More specifically, an upper half of the housing section 28 in FIG. 5 has a thickness that is substantially equal to a thickness of the strut 26 or that is slightly larger than the thickness of the strut 26. Then, a lower half of the housing section 28 in FIG. 5 has a thickness that is larger than the thickness of the strut 26. In this way, the strut 26 is configured to be able to swing with the support pin 30 being the center.

A spring 31 that causes an elastic force to act in a direction to push out one end side of the strut 26 from the housing section 28 is arranged in a shallow portion of the housing section 28. In addition, an actuator 32 that presses another end side of the strut 26 in the direction to push out from the housing section 28 is arranged in a deep portion of the housing section 28. This actuator 32 only needs to be able to apply a pressing force to the other end side of the strut 26. For example, a hydraulic actuator such as a hydraulic piston or an electromagnetic actuator such as a solenoid that generates thrust by using an electromagnetic force can be adopted. Accordingly, in a state that the actuator 32 does not press the other end of the strut 26, it is configured that the one end of the strut 26 is pressed by the spring 31 and is projected from the housing section 28 toward the pocket 29 on the second clutch plate 25 side. In addition, in a state that the actuator 32 presses the other end of the strut 26, it is configured that the strut 26 rotates about the support pin 30 in a direction to compress the spring 31 and that the entire strut 26 is housed in the housing section 28. In other words, it is configured to inhibit the strut 26 from being projected to the second clutch plate 25 side.

As described above, the spring 31 and the actuator 32 constitute the actuation mechanism 27 for operating the strut 26. Then, as described above, a state that the actuator 32 does not press the other end of the strut 26 and that the one end of the strut 26 is pressed by the spring 31 and projected from the housing section 28 toward the pocket 29 on the second clutch plate 25 side corresponds to a state that the projection of the strut 26 to the second clutch plate 25 is permitted. That is, such a state is an example of the first state of the invention. In addition, a state that the actuator 32 presses the other end of the strut 26, that the strut 26 rotates about the support pin 30 in a direction to compress the spring 31, and that the entire strut 26 is housed in the housing section 28 corresponds to a state that the projection of the strut 26 to the second clutch plate 25 side is inhibited. That is, such a state is an example of the second state of the invention. Accordingly, the actuation mechanism 27 for operating the strut 26 by the above spring 31 and actuator 32 is an example of a switching mechanism of the invention.

Noted that, in the above engagement mechanism 23, an appropriate elastic member such as a spring may be interposed between the actuator 32 and the other end of the strut 26 in order to relax the pressing force generated by the actuator 32 or to permit swinging of the strut 26 in the state that the actuator 32 presses the other end of the strut 26. In addition, in the following description, it is configured that, when the actuator 32 is controlled to be OFF, the actuator 32 presses the other end of the strut 26 so as to bring the engagement mechanism 23 into a disengaged state. It is also configured that, when the actuator 32 is controlled to be ON, the actuator 32 cancels pressing of the other end of the strut 26 so as to bring the engagement mechanism 23 into an engaged state. These examples will be described.

As described above, the pocket 29 that is formed in the second clutch plate 25 is a portion which the one end of the strut 26 projected from the housing section 28 enters and is engaged with. Accordingly, in the engagement mechanism 23, in a state that the one end of the strut 26 is projected to the second clutch plate 25 side, in the case where torque in the positive rotational direction acts on either one of the clutch plates 24, 25, that is, where torque in an upward direction of FIG. 5 acts on the first clutch plate 24 or where torque in a downward direction of FIG. 5 acts on the second clutch plate 25, the strut 26 is meshed between the housing section 28 and the pocket 29. As a result, the clutch plates 24, 25 are integrally coupled in the rotational direction. That is, the relative rotation of the first clutch plate 24 in the upward direction of FIG. 5 to the second clutch plate 25 is restricted. In other words, the relative rotation of the second clutch plate 25 in the downward direction of FIG. 5 to the first clutch plate 24 is restricted. The restricted rotational direction in this case is the positive rotational direction in each of the power transmission mechanisms shown in above-described FIG. 1 and FIG. 3. A state that the positive rotation of the above-described sun gear 5 or ring gear 22 is restricted (or inhibited), just as described, is the engaged state of the engagement mechanism 23 or the SOWC 17.

In the engaged state of the SOWC 17 as described above, in the case where the torque in the reverse rotational direction (the negative rotational direction) acts on either one of the clutch plates 24, 25, that is, where the torque in the downward direction of FIG. 5 acts on the first clutch plate 24 or where the torque in the upward direction of FIG. 5 acts on the second clutch plate 25, the surface of the strut 26 is pressed by an edge portion of an opening end of the pocket 29 in the second clutch plate 25. As a result, the strut 26 acts against the elastic force of the spring 31 and is pushed in the housing section 28. In other words, the engagement by the strut 26 is canceled, and the clutch plates 24, 25 can make the relative rotation. Then, when the actuator 32 presses the other end of the strut 26, the strut 26 rotates in such a direction that the one end thereof enters the housing section 28 while compressing the spring 31. As a result, the strut 26 is housed in the housing section 28. Accordingly, the member that connects the clutch plates 24, 25 no longer exists, and thus the clutch plates 24, 25 can make the relative rotation in either the positive rotation or the negative rotation. This state is the disengaged state of the engagement mechanism 23, that is, the SOWC 17.

As described above, the engaged state and the disengaged state of the SOWC 17 are switched by the operation of the actuator 32. Accordingly, it is possible by detecting the operating state or an operation amount of the actuator 32 to determine whether the SOWC 17 is in the engaged state or the disengaged state on the basis of the detection result. For this reason, the engagement mechanism 23 is provided with a stroke sensor 33 for performing the detection as described above. An appropriate sensor that has conventionally been known can be adopted for this stroke sensor 33. For example, the stroke sensor 33 may be a type of sensor that detects a stroke of the actuator 32 by capacitance or electrical resistance that varies by the operation amount of the actuator 32, a type of sensor that detects the stroke of the actuator 32 optically, or the like. In addition, instead of detecting the stroke of the actuator 32, a so-called ON/OFF sensor may output a signal at an advanced end and a retracted end of the actuator 32.

As described above, the SOWC 17 can be engaged when the differential rotation between the first clutch plate 24 and the second clutch plate 25 is positive. In other words, in the state of the positive differential rotation of the SOWC 17, the strut 26 is fitted to and engaged with the pocket 29 at the position between the first clutch plate 24 and the second clutch plate 25. Accordingly, the torque can be transmitted between the first clutch plate 24 and the second clutch plate 25 via the strut 26. For this reason, if the strut 26 is operated to be engaged with the pocket 29 in the state of the positive differential rotation of the SOWC 17, there is a case where the torque is applied to the strut 26 that is in the middle of a path for the strut 26 to be completely engaged at a specified position in the pocket 29 and thus the strut 26 is engaged with the pocket 29 at an improper position. In such an improper engaged state, surface pressure that acts on a contact portion between the strut 26 and the pocket 29 is possibly increased, and, as a result, the load applied to the strut 26 is possibly increased. In addition, when the strut 26 and the pocket 29 are engaged in the state of the positive differential rotation of the SOWC 17, inertia torque from any of the other rotary members is possibly applied to the strut 26, and thus the shock or impact force is possibly generated.

Figure 7A:
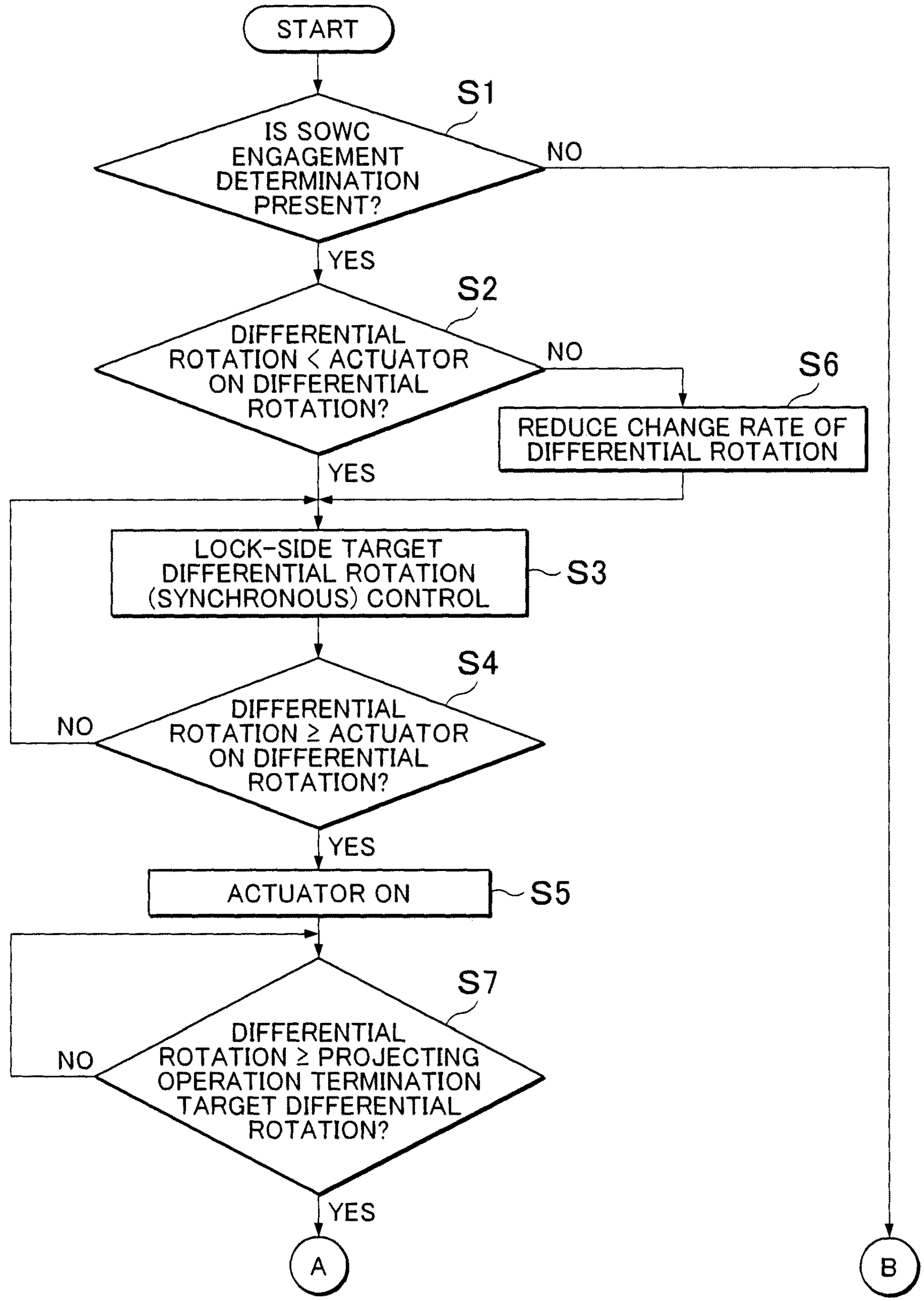
FIG. 7A and FIG. 7B is a flowchart for illustrating an example of control that is executed by a control device of the invention.
Figure 7B:
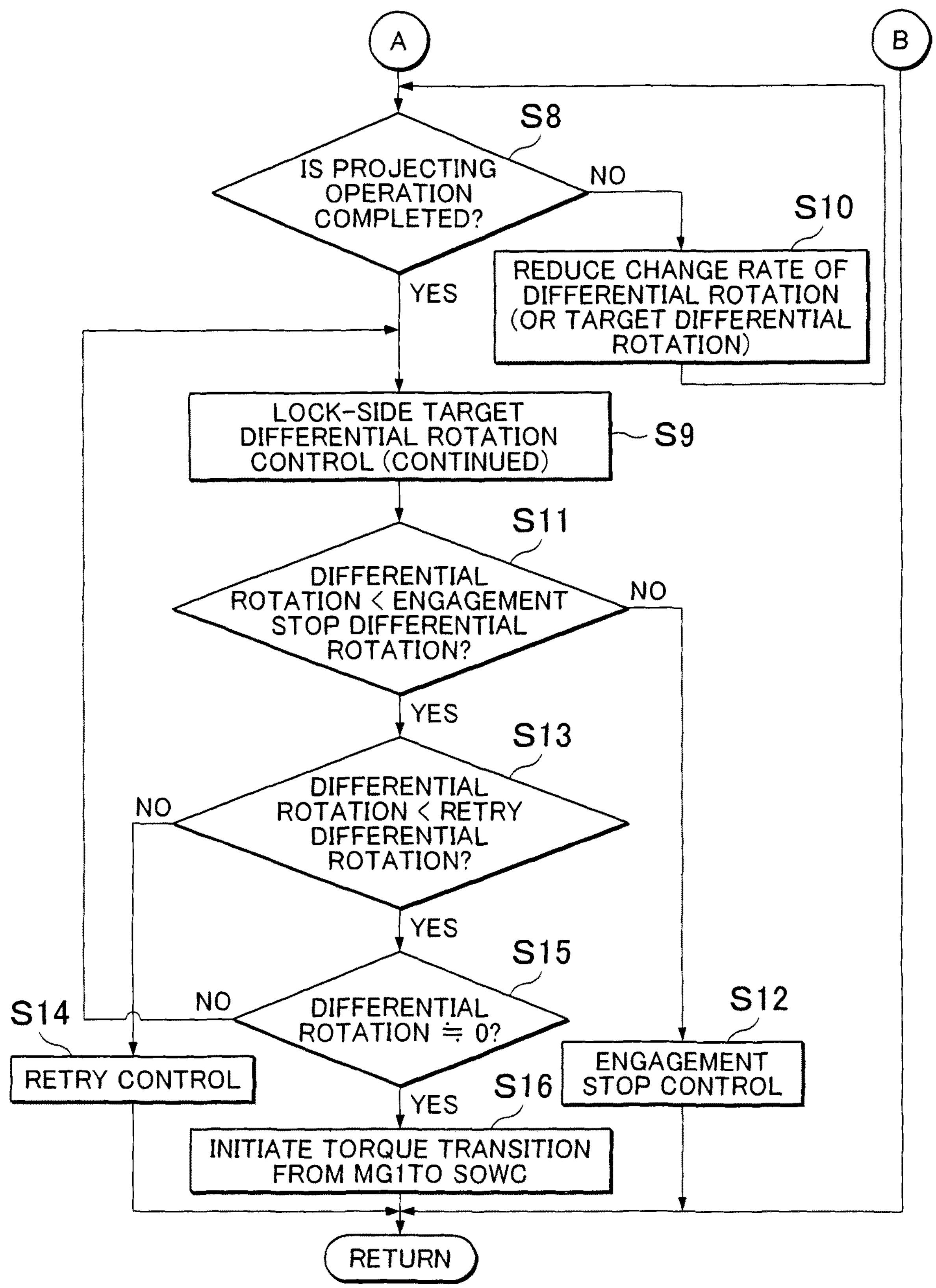

In view of this, the control system according to the invention that has the above power transmission mechanism as the subject thereof is configured to execute control, which will be described below, such that the SOWC 17 can be engaged when the differential rotation is negative. FIG. 7 and FIG. 7B is a flowchart for illustrating an example of such control. A routine shown in this flowchart of FIG. 7 and FIG. 7B is repeatedly executed at specified short time intervals. In addition, in the routine shown in this flowchart of FIG. 7A and FIG. 7B, the control is executed with an assumption that the vehicle Ve travels while the SOWC 17 is disengaged and that the differential rotation of the SOWC 17 is negative.

In the flowchart of FIG. 7 and FIG. 7B, it is first determined whether the SOWC 17 will be engaged (step S1). If a negative determination is made in this step S1 due to the lack of a request for engaging the SOWC 17, this routine is once terminated without executing control in the following steps.

On the contrary, if a positive determination is made in step S1 due to the presence of the request for engaging the SOWC 17, a process proceeds to step S2. The positive determination is made in step S1 if an engagement determination for switching the SOWC 17 from the disengaged state to the engaged state is made. In this case, the process proceeds to step S2. For example, in the example of the configuration shown in FIG. 1, when the vehicle Ve travels forward by the output of the engine 1 and the output of the second motor 3, the rotation of the first motor 2 and the rotation of the sun gear 5 are locked. In such a case, the engagement determination is made, and then the SOWC 17 is engaged. Alternatively, in the example of the configuration shown in FIG. 3, when the overdrive state is set, the rotation of the ring gear 22 in the overdrive mechanism 19 is locked. In such a case, the engagement determination is made, and then the SOWC 17 is engaged.

In step S2, it is determined whether the differential rotation of the SOWC 17 is lower than actuator ON differential rotation. The actuator ON differential rotation is differential rotation at which ON control of the actuator 32 is initiated so as to cause the engagement of the SOWC 17 and at which control for setting a state that the actuation mechanism 27 is actuated to permit the projection of the strut 26 to the second clutch plate 25 (that is, the engagement control for setting the first state of the invention) is initiated. This actuator ON differential rotation is set as a threshold of the differential rotation for determining initiation timing of the engagement control such that the operation of the strut 26 to be projected to the second clutch plate 25 side by the actuator 32 is completed when the differential rotation of the SOWC 17 reaches lock-side target differential rotation, which will be described below. Thus, this actuator ON differential rotation is an example of the second target differential rotation of the invention. Noted that this actuator ON differential rotation is set in advance on the basis of a result of an experiment, a simulation, or the like in consideration of an operation time period of the actuation mechanism 27 and responsiveness of the actuator 32 when the engagement control is executed, time required for the strut 26 to perform the projecting operation, or the like, for example.

Figure 8:
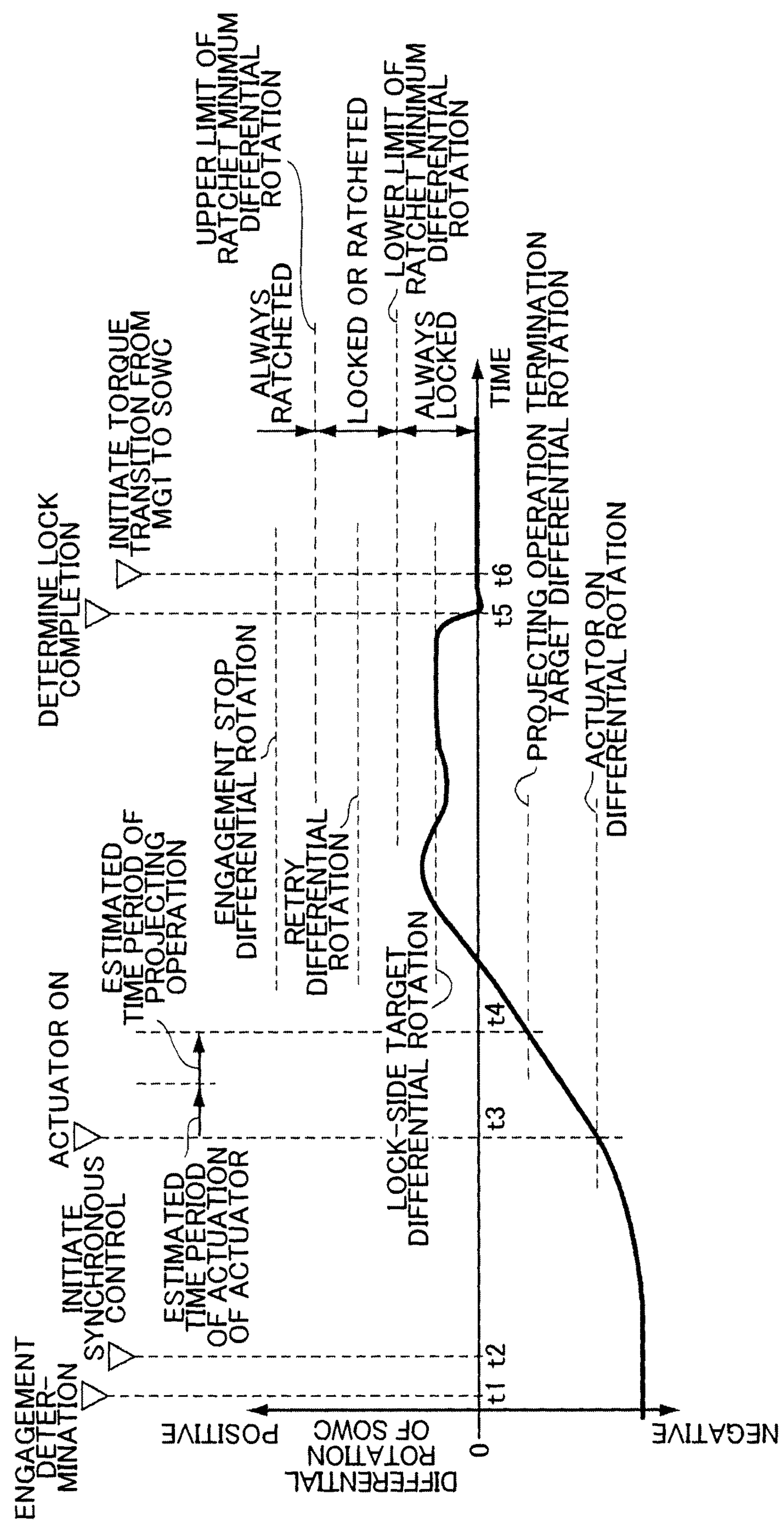
FIG. 8 is a time chart that shows an example of a change in differential rotation of the selectable one-way clutch when the control illustrated in the flowchart of FIG. 7A

A positive determination is made in step S2 if the differential rotation of the SOWC 17 is lower than the actuator ON differential rotation. In this case, the process proceeds to step S3. Then, synchronous control is initiated. Here, the synchronous controls refers to a series of control of the rotational speed that is executed to cause the engagement of the SOWC 17. The synchronous control is control in which the negative differential rotation of the SOWC 17 is gradually increased to the positive side, so as to bring the SOWC 17 into an engageable state. More specifically, the differential rotation of the SOWC 17 is increased to the lock-side target differential rotation on a positive side, and the rotation of the first motor 2 is controlled such that the differential rotation of the SOWC 17 is maintained at the lock-side target differential rotation. The lock-side target differential rotation in this case corresponds to a target value at which the differential rotation of the SOWC 17 is maintained in the positive state in this synchronous control. The lock-side target differential rotation in this case is the differential rotation that allows the engagement of the SOWC 17 in the state that the differential rotation of the SOWC 17 is positive. This lock-side target differential rotation is set in advance as an appropriate value for the engagement of the SOWC 17 on the basis of a result of an experiment, a simulation, or the like in consideration of a fluctuation in the rotational speed caused by control disturbance, such as a fluctuation in torque of the engine 1 or input of disturbance torque, responsiveness of the control, such as a delayed time period and the overshoot, and the like, for example. In addition, as shown in FIG. 8, this lock-side target differential rotation is set as a value that is lower than a lower limit of ratchet minimum differential rotation, which will be described below. As described above, this synchronous control is an example of rotation control of the invention.

Once the synchronous control is executed in step S3, it is determined whether the differential rotation of the SOWC 17 becomes equal to or higher than the actuator ON differential rotation, that is, whether the differential rotation of the SOWC 17 is increased on the positive side, so as to become equal to or higher than the actuator ON differential rotation (step S4).

A negative determination is made in this step S4 if the differential rotation of the SOWC 17 has not reached the actuator ON differential rotation. In this case, the process returns to step S3, and the above synchronous control is continued.

On the contrary, a positive determination is made in step S4 if the differential rotation of the SOWC 17 is increased on the positive side, so as to become equal to or higher than the actuator ON differential rotation. In this case, the process proceeds to step S5. Then, the above synchronous control is continued, and the ON control of the actuator 32 is initiated. That is, the engagement control is initiated.

Meanwhile, if a negative determination is made in above-described step S2, the process proceeds to step S6. Then, after a change rate of the differential rotation of the SOWC 17 is reduced, that is, after a speed of change of the differential rotation in the synchronous control is reduced, the process proceeds to step S3. Then, the synchronous control as described above is executed. In other words, in this step S6, the rotation of the first motor 2 is controlled such that the speed of change of the differential rotation of the SOWC 17 in the synchronous control, which is executed in step S3, is reduced.

Just as described, in the case where the differential rotation of the SOWC 17 is already higher than the actuator ON differential rotation on the positive side when the SOWC 17 in the disengaged state is switched to the engaged state, the speed of change of the differential rotation in the synchronous control is reduced as described above. In this way, time required for the differential rotation to later reach projecting operation termination target differential rotation, which will be described below, can be extended. For this reason, additional time can be provided to complete the projecting operation of the strut 26 before the differential rotation reaches the projecting operation termination target differential rotation. As a result, the projecting operation of the strut 26 can be completed while the differential rotation is negative.

If the ON control, that is, the engagement control of the actuator 32 is initiated in above step S5, it is determined whether the differential rotation of the SOWC 17 has reached the projecting operation termination target differential rotation (step S7). This projecting operation termination target differential rotation is set as a target value of the differential rotation at a point of time when the projecting operation of the strut 26 is completed in the case where the engagement control as described above is executed. This projecting operation termination target differential rotation can be set in advance on the basis of a result of an experiment, a simulation, or the like in consideration of the actuation time period of the actuation mechanism 27 and the responsiveness of the actuator 32 when the engagement control is executed, the time required for the strut 26 to perform the projecting operation, or the like, for example. Thus, this projecting operation termination target differential rotation is an example of the first target differential rotation of the invention.

A negative determination is made in this step S7 if the differential rotation of the SOWC 17 has not reached the projecting operation termination target differential rotation. In this case, the control in this step S7 is executed again. In other words, the control in this step S7 is repeated until the differential rotation of the SOWC 17 reaches the projecting operation termination target differential rotation.

On the contrary, a positive determination is made in step S7 if the differential rotation of the SOWC 17 is increased to be equal to or higher than the projecting operation termination target differential rotation on the positive side. In this case, the process proceeds to step S8. Then, it is determined whether the projecting operation of the strut 26 has been completed. Once the engagement control is initiated as described above, the actuator 32 is operated to cancel pressing the strut 26, so as to project the strut 26 to the second clutch plate 25 side. Then, the strut 26, the pressing of which by the actuator 32 is canceled, is pressed by the spring 31 and is operated, so as to be projected to the pocket 29 side of the second clutch plate 25. Accordingly, the determination on whether the projecting operation of the strut 26 has been completed can be made by estimating the actuation time period of the actuator 32 and a time period for the projecting operation of the strut 26 and by determining whether these estimated time periods have elapsed. Alternatively, the determination on whether the projecting operation of the strut 26 has been completed can be made by detecting a stroke position of the actuator 32 on the basis of the detection signal of the stroke sensor 33 or the ON/OFF sensor and by gathering information of the detection and the estimated operation time period of the strut 26.

A positive determination is made in this step S8 if the projecting operation of the strut 26 has been completed. In this case, the process proceeds to step S9. Then, the above-described synchronous control is continued.

On the other hand, a negative determination is made in step S8 if the projecting operation of the strut 26 has not been completed. In this case, the process proceeds to step S10. Then, the change rate of the differential rotation of the SOWC 17 is reduced. In other words, the speed of change of the differential rotation in the synchronous control is reduced. Then, the process returns to above step S8, and the same control is executed again. In other words, in this step S10, the rotation of the first motor 2 is controlled such that the speed of change of the differential rotation of the SOWC 17 in the synchronous control, which is executed continuously in step S9, is reduced.

Just as described, upon switching of the SOWC 17 in the disengaged state to the engaged state, in the case where the projecting operation of the strut 26 has not been completed when the differential rotation reaches the projecting operation termination target differential rotation, the speed of change of the differential rotation in the synchronous control is reduced as described above. Accordingly, time required for the differential rotation to later become zero and be further shifted to the positive side can be extended. For this reason, the additional time can be provided to complete the projecting operation of the strut 26 while the differential rotation is negative. As a result, the projecting operation of the strut 26 can be completed while the differential rotation is negative.

Noted that, in the case where the speed of change of the differential rotation in the synchronous control is reduced as described above, it can also be controlled such that the speed of change of the differential rotation is set to zero or substantially zero and thus the differential rotation is substantially maintained at the projecting operation termination target differential rotation until the projecting operation of the strut 26 is completed. It can also be controlled such that, by lowering an absolute value of the projecting operation termination target differential rotation, the additional time is provided to complete the projecting operation of the strut 26 while the differential rotation is negative.

As described above, the engagement mechanism 23 of this SOWC 17 can be engaged when the differential rotation of the SOWC 17 is positive. In addition to the above, this SOWC 17 is provided with a ratchet function that inhibits the engagement between the strut 26 and the pocket 29 when the differential rotation is excessively high. More specifically, this SOWC 17 is configured that the strut 26 is flicked by an opening portion of the pocket 29 and thus cannot be engaged with the pocket 29 (that is, an ratchet action is exerted) when the differential rotation of the SOWC 17 is higher than specified differential rotation. The specified differential rotation in this case is the ratchet minimum differential rotation. Accordingly, the SOWC 17 is configured that it can be engaged (locked) when the differential rotation thereof is lower than the ratchet minimum differential rotation and that it is ratcheted and thus cannot be engaged when the differential rotation thereof is higher than the ratchet minimum differential rotation. If the SOWC 17 is engaged at the high differential rotation, the impact caused by the engagement of the strut 26 and the pocket 29 becomes substantial. However, due to the provision of the ratchet function as described above, the impact or shock during the engagement can be suppressed.

Furthermore, a fluctuation in the ratchet minimum differential rotation is unavoidable due to a structure of the engagement mechanism 23. In other words, when the differential rotation of the SOWC 17 is close to the ratchet minimum differential rotation, there is a case where the SOWC 17 can be either locked or ratcheted. For this reason, as shown in FIG. 8, an upper limit and a lower limit are set for the ratchet minimum differential rotation in this lock rotation control. In other words, the ratchet minimum differential rotation has a specified differential rotation range between the upper limit of the ratchet minimum differential rotation and the lower limit of the ratchet minimum differential rotation. Then, when the differential rotation of the SOWC 17 is higher than the upper limit of the ratchet minimum differential rotation, the SOWC 17 is always ratcheted to prevent the engagement thereof. On the contrary, when the differential rotation of the SOWC 17 is lower than the lower limit of the ratchet minimum differential rotation, the SOWC 17 is always engaged.

Next, it is determined whether the differential rotation of the SOWC 17 is lower than engagement stop differential rotation (step S11). As shown in FIG. 8, this engagement stop differential rotation is set as a higher value than the upper limit of the above ratchet minimum differential rotation. Accordingly, a negative determination is made in this step S11 if the differential rotation of the SOWC 17 is equal to or higher than the engagement stop differential rotation. In this case, the process proceeds to step S12, and engagement stop control for stopping a series of the synchronous control, which includes the lock rotation control, is executed. Then, this routine is terminated once.

On the contrary, a positive determination is made in step S11 if the differential rotation of the SOWC 17 is lower than the engagement stop differential rotation. In this case, the process proceeds to step S13. Then, it is determined whether the differential rotation of the SOWC 17 is lower than retry differential rotation. As shown in FIG. 8, this retry differential rotation is set as a value that is lower than the upper limit of the above ratchet minimum differential rotation and is also higher than the lower limit of the ratchet minimum differential rotation. Accordingly, when the differential rotation of the SOWC 17 is higher than this retry differential rotation, a possibility that the SOWC 17 is ratcheted and thus cannot be engaged is increased. Thus, a negative determination is made in this step S13 if the differential rotation of the SOWC 17 is equal to or higher than this retry differential rotation. In this case, the process proceeds to step S14, and retry control is executed. More specifically, the differential rotation of the SOWC 17 is once reduced to the negative side. For example, the differential rotation of the SOWC 17 is once reduced to differential rotation that is set as a specified smaller value on the negative side than the actuator ON differential rotation. Then, this routine is terminated once.

On the contrary, a positive determination is made in step S13 if the differential rotation of the SOWC 17 is lower than this retry differential rotation. In this case, the process proceeds to step S15. Then, it is determined whether the differential rotation of the SOWC 17 becomes substantially zero. In other words, it is determined in this step S15 whether the SOWC 17 has become engaged. It can be determined that the SOWC 17 has become engaged in the case where the differential rotation of the SOWC 17 that is maintained at the lock-side target differential rotation becomes substantially zero. Accordingly, a negative determination is made in this step S15 if the differential rotation of the SOWC 17 has not become substantially zero. In this case, the process returns to step S9, and the synchronous control is continued in the same manner.

On the contrary, a positive determination is made in step S15 if the differential rotation of the SOWC 17 has become substantially zero, that is, if it is determined that the SOWC 17 has become engaged. In this case, the process proceeds to step S16. Then, transition of torque from the first motor 2 to the SOWC 17 is initiated. More specifically, the first motor 2 is controlled such that the output torque thereof becomes zero. For example, in the example of the configuration shown in FIG. 1, the output torque of the first motor 2 becomes zero in a state that the rotation of the first motor 2 and the rotation of the sun gear 5 are locked by the SOWC 17. Alternatively, in the example of the configuration shown in FIG. 3, the output torque of the first motor 2 becomes zero in a state that the rotation of the ring gear 22 in the overdrive mechanism 19 is locked by the SOWC 17. Then, this routine is terminated once.

A time chart in FIG. 8 shows an example of the change in the differential rotation of the SOWC 17 when the above control shown in the flowchart in FIG. 7A and FIG. 7B is executed. In the case where a determination for switching the SOWC 17 to the engaged state is established in a state that the vehicle Ve travels and the SOWC 17, of which the differential rotation is negative, is disengaged (time t1), the above-described synchronous control is initiated (time t2). Then, the rotation of the first motor 2 is controlled such that the differential rotation of the SOWC 17 is gradually increased to the positive side.

The differential rotation of the SOWC 17 is gradually increased to the positive side and eventually reaches the actuator ON differential rotation. At this time, the actuator 32 is controlled to be ON (time t3). That is, the engagement control is initiated. Thereafter, at a point of time when the differential rotation becomes the projecting operation termination target differential rotation (time t4), the projecting operation of the strut 26 is completed. As described with reference to the flowchart in FIG. 7A and FIG. 7B, in the case where the projecting operation of the strut 26 has not been completed at this time t4 when the differential rotation reaches the projecting operation termination target differential rotation, the speed of change of the differential rotation in the synchronous control is reduced.

As described above, since the projecting operation of the strut 26 is completed when the differential rotation of the SOWC 17 reaches the projecting operation termination target differential rotation at the time t4, the synchronous control is continuously executed. Then, the rotation of the first motor 2 is controlled such that the differential rotation of the SOWC 17 is increased to the lock-side target differential rotation that is set on the positive side. Then, once the differential rotation of the SOWC 17 becomes the lock-side target differential rotation, the rotation of the first motor 2 is subject to feedback control such that the differential rotation is maintained at the lock-side target differential rotation. As described above, the lock-side target differential rotation is set as the smaller value on the positive side than the lower limit of the ratchet minimum differential rotation at which the SOWC 17 is always engaged. For this reason, the SOWC 17 can be smoothly shifted to the engaged state in the state that the differential rotation thereof is maintained at the lock-side target differential rotation.

Since the engagement of the SOWC 17 is completed as described above, the differential rotation of the SOWC 17 becomes zero (time t5). Accordingly, it can be determined that the engagement of the SOWC 17 is completed by monitoring the change of the differential rotation of the SOWC 17. Once it is determined that the engagement of the SOWC 17 is completed, just as described, the torque transition from the first motor 2 to the SOWC 17 is initiated (time t6). More specifically, the first motor 2 is controlled such that the output torque thereof becomes zero.

As it has been described specifically so far, according to the control device of the invention, in the case where the SOWC 17, of which differential rotation is negative, is switched from the disengaged state to the engaged state, the rotation control of the first motor 2, that is, the synchronous control is executed such that the differential rotation of the SOWC 17 is increased to the positive side. At the same time, the state that the actuation mechanism 27 is actuated and thus the projection of the strut 26 to the second clutch plate 25 is permitted (the first state) is set. That is, the engagement control is initiated. Accordingly, the actuation mechanism 27 is actuated such that the operation of the strut 26 to be projected to the pocket 29 side of the clutch plate 25 is completed while the differential rotation is negative. In this case, as the target value and the threshold for the control of the differential rotation, the projecting operation termination target differential rotation (the first target differential rotation) and the actuator ON differential rotation (the second target differential rotation) are set, respectively. Then, the engagement control is initiated at the point of time when the differential rotation, which is increased to the positive side by the synchronous control (the rotation control), reaches the actuator ON differential rotation such that the projecting operation of the strut 26 is completed when the differential rotation reaches the projecting operation termination target differential rotation. In this case, the above projecting operation termination target differential rotation and actuator ON differential rotation are set in consideration of the actuation time period of the actuation mechanism 27, the time required for the strut 26 to complete the projecting operation, or the like, for example. Thus, the projecting operation of the strut 26 as described above can be completed while the differential rotation is negative. For this reason, the strut 26 can easily be engaged with the pocket 29 without applying the excessive load or impact force to the strut 26. In addition, the strut 26 can reliably be engaged at the specified position in the pocket 29. As a result, the SOWC 17 in the disengaged state can appropriately be switched to the engaged state. Furthermore, since the SOWC 17 is appropriately switched to the engaged state as described above, a time period in which the SOWC 17 rotates idle without the engagement of the strut 26 and the pocket 29 despite the projecting operation of the strut 26, that is, a time period in which the SOWC 17 is in a so-called overrunning state can be reduced as much as possible. Accordingly, it is possible to suppress vibration or noise that is possibly generated when the SOWC 17 is in the overrunning state and wear of a contact portion between the strut 26 and the second clutch plate 25.

Noted that, in the above-described control example, it is configured that, in the case where the engagement determination of the SOWC 17 is made, the ON control of the actuator 32, that is, the engagement control is initiated when the differential rotation of the SOWC 17 reaches the actuator ON differential rotation (the second target differential rotation). Meanwhile, in this embodiment, it can also be configured that, in the case where the engagement determination of the SOWC 17 is made, the engagement control is initiated immediately. More specifically, as shown in a part of a flowchart in FIG. 9, if the engagement determination for switching the SOWC 17 from the disengaged state to the engaged state is made in step S1, the process proceeds to step S20. Then, the ON control of the actuator 32, that is, the engagement control is initiated immediately, that is, without waiting for the differential rotation of the SOWC 17 to reach the actuator ON differential rotation (the second target differential rotation). Then, the process proceeds to step S3, and the synchronous control, in which the differential rotation of the SOWC 17 is increased to the lock-side target differential rotation on the positive side and maintained at the lock-side target differential rotation, is initiated. The control in this step S3 onward and the control that is executed in the case where a negative determination is made in above step S1 are the same as the above-described control illustrated in the flowchart of FIG. 7A and FIG. 7B. Thus, the description thereof will not be made herein.

Figure 9:
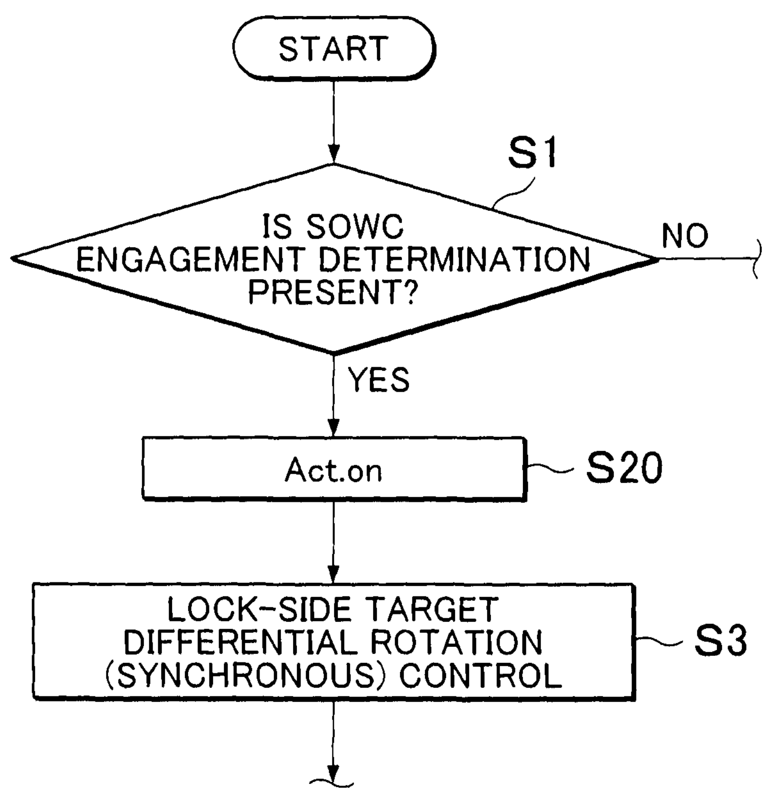
FIG. 9 is a part of a flowchart for illustrating another example of the control that is executed by the control device of the invention.

In a control example shown in this flowchart of FIG. 9, in the case where the SOWC 17, of which differential rotation is negative, is switched from the disengaged state to the engaged state, the engagement control for controlling the actuator 32 to be ON is immediately initiated in conjunction with the engagement determination of the SOWC 17. Accordingly, the projecting operation of the strut 26 can be completed as soon as possible. Thus, the SOWC 17 in the disengaged state can appropriately be switched to the engaged state. In addition, responsiveness of the control can be improved by reducing the time required for switching to the engaged state.

Figure 10:
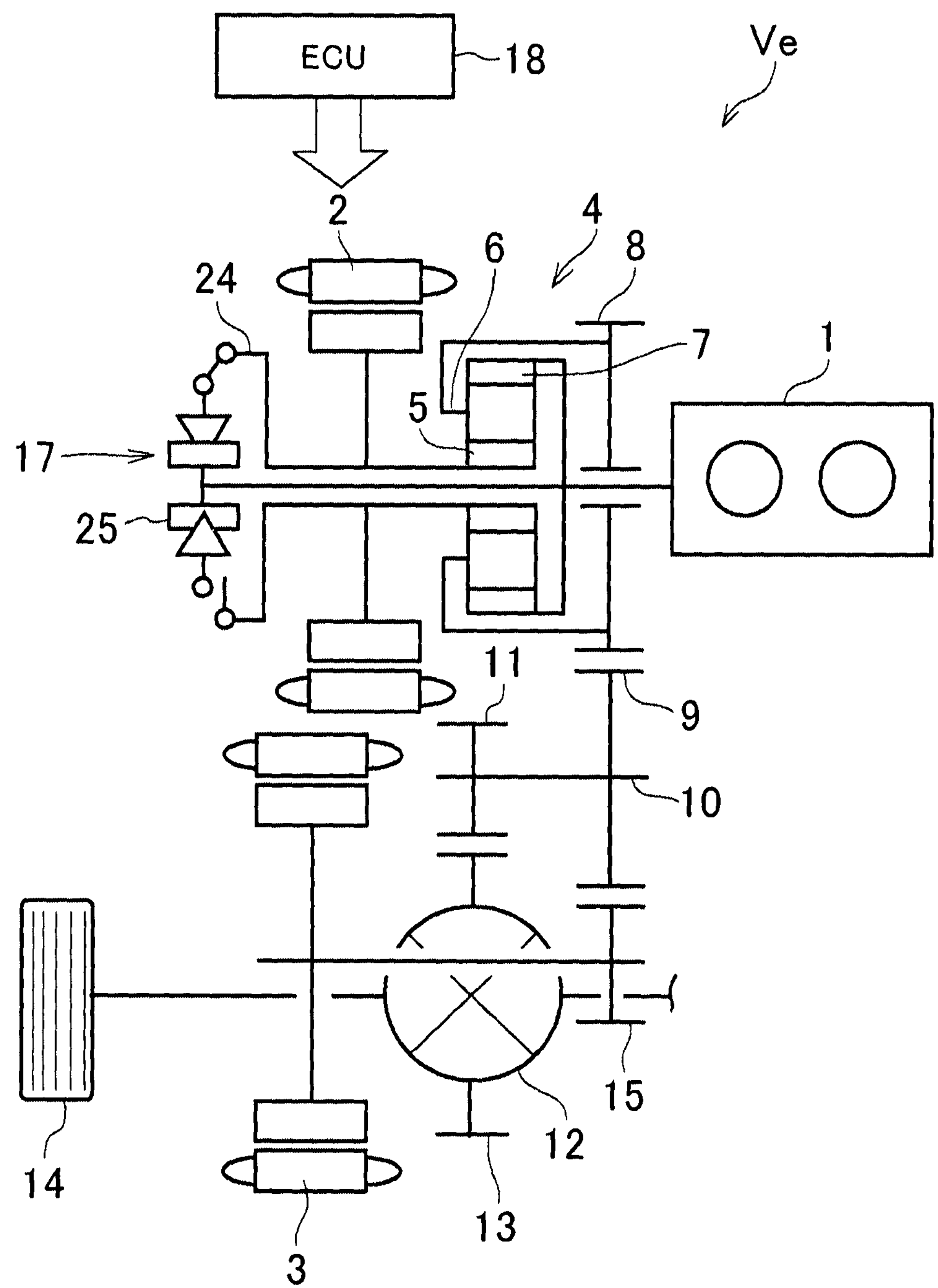
FIG. 10 is a view of yet another example of the configuration of the power transmission mechanism in the hybrid vehicle to which the invention is applied.

In addition, in the above-described specific example, the configuration in which the SOWC 17 is used as a brake for selectively stopping the rotation of the sun gear 5 or the ring gear 22 is described. Meanwhile, in this embodiment, the SOWC 17 can also be configured such that it is used as a clutch for selectively transmitting the torque between the two rotary members. Such an example is shown in FIG. 10. A part of the configuration shown in FIG. 1, which is described above, is modified for this example of the configuration shown in FIG. 10. More specifically, instead of the engine 1, the output gear 8 is coupled to the carrier 6 in the planetary gear mechanism, which constitutes the power split mechanism 4. In addition, instead of the output gear 8, the engine 1 is coupled to the ring gear 7. Furthermore, the SOWC 17 shown in this FIG. 10 is configured to selectively couple the ring gear 7 (the engine 1) and the sun gear 5. A direction of engagement of the SOWC 17 in this case is a direction in which the torque is transmitted from the engine 1 to the sun gear 5 in the positive rotational direction. The rest of the configuration is the same as the configuration shown in FIG. 1. Accordingly, components shown in this FIG. 10 are denoted by the same reference numerals as those used in FIG. 1, and the description thereof will not be made.

In the power transmission mechanism that is configured as shown in FIG. 10, the HV mode (or the power split mode) and a direct connection mode (or the parallel mode) can be set. In the HV mode, the power output by the engine 1 is divided by the output gear 8 and the first motor 2. In the direct connection mode, a differential action of the power split mechanism 4 is stopped, and the entire power split mechanism 4 is integrated for rotation. The SOWC 17 shown in this FIG. 10 is engaged when the vehicle Ve travels forward in the above direct connection mode.

Figure 11:
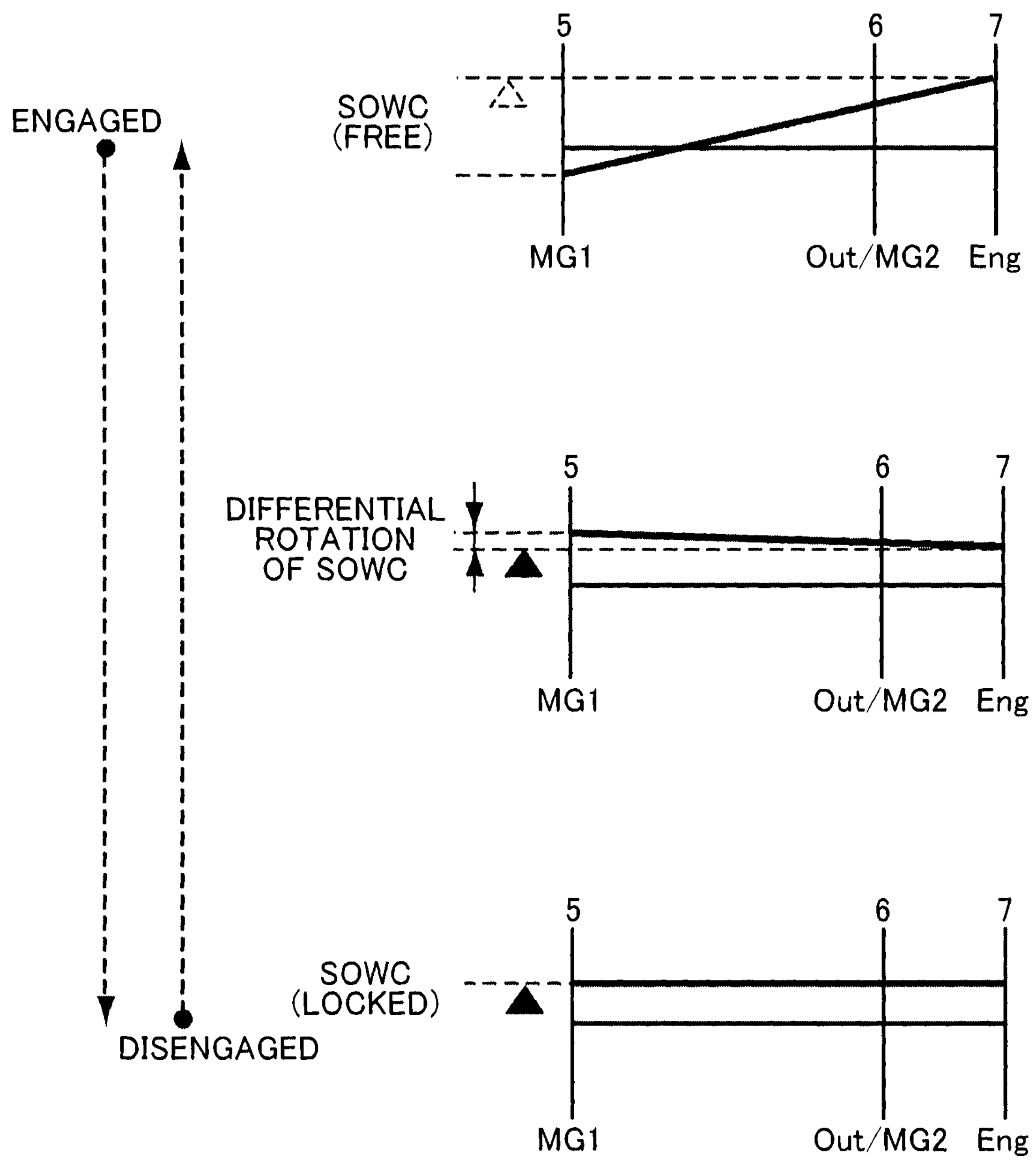
FIG. 11 includes collinear charts on the planetary gear mechanism that constitutes the power split mechanism in the hybrid vehicle shown in FIG. 10.

FIG. 11 includes collinear charts on the planetary gear mechanism that constitutes the power split mechanism 4 shown in FIG. 10. A top diagram in FIG. 11 indicates a state that the vehicle Ve travels forward in the HV mode with the SOWC 17 being disengaged. In this state shown in the top diagram in FIG. 11, the torque in the positive rotational direction of the engine 1 is transmitted to the ring gear 7. Meanwhile, reaction torque in the reverse rotational direction that is generated in conjunction with the travel of the vehicle Ve acts on the carrier 6. Accordingly, the torque in the reverse rotational direction acts on the sun gear 5. This corresponds to the torque in the positive rotational direction of the engine 1 with respect to the sun gear 5. However, since the SOWC 17 is disengaged, the sun gear 5 rotates reversely as shown in the top diagram in FIG. 11, for example. In this case, the first motor 2 that is coupled to this sun gear 5 functions as the electrical power generator and applies the torque in the positive rotational direction (the upward direction in the top diagram in FIG. 11) as the reaction force to the sun gear 5. As a result, the torque of the engine 1 is amplified and transmitted to the output gear 8, which is coupled to the carrier 6. In addition, the first motor 2 controls the speed of the engine 1 to a speed at which the excellent fuel efficiency can be realized. Furthermore, the electrical power generated in the first motor 2 is supplied to the second motor 3. Then, the second motor 3 functions as the motor. In other words, some of the power of the engine 1 that has been converted to the electrical power is converted to the mechanical power again, and is transmitted to the drive wheels 14.

A second diagram from the top in FIG. 11 indicates the transient state (the transition state) in which the SOWC 17 is switched between the state shown in the top diagram in FIG. 11 and a state shown in the third diagram from the top in FIG. 11, which will be described below. In other words, the second diagram from the top in FIG. 11 indicates the transient state when the SOWC 17 is switched from the disengaged state (free) to the engaged state (locked) in which the SOWC 17 restricts the relative rotation between the sun gear 5 and the engine 1. In this state shown in the second diagram from the top in FIG. 11, the first motor 2 functions as the motor and rotates the sun gear 5 in the positive rotational direction. At this time, the rotational speed of the sun gear 5 exceeds the speed of the engine 1. In other words, the first motor 2 is controlled such that the engine 1 makes the reverse rotation (the negative rotation) relative to the sun gear 5. Such relative rotation is an example of the differential rotation of the invention. In this state shown in the second diagram from the top in FIG. 11, the negative differential rotation is produced. In other words, the SOWC 17 does not transmit the torque. Thus, when the control for switching the SOWC 17 to the engaged state is executed in this state, the torque is not applied to the strut 26 of the SOWC 17. Noted that, in the state shown in the second diagram from the top in FIG. 11, the direction of the differential rotation, the direction of the torque of the first motor 2, and the rotational direction of the first motor 2 are opposite from those in the example shown in the collinear charts of above-described FIG. 2 and FIG. 4. However, as described above, the SOWC 17 shown in FIG. 10 is configured such that the differential rotation produced in the state shown in the second diagram from the top in FIG. 11 is the negative differential rotation. Accordingly, the same control as the control example shown in the flowchart of FIG. 7 and FIG. 7B or FIG. 9 is executed so that the SOWC 17 can reliably and appropriately be engaged.

A third diagram from the top in FIG. 11 indicates a state that the vehicle Ve travels forward in the direct connection mode. In the forward travel state, as described above, the torque in the direction to cause the reverse rotation of the sun gear 5 acts thereon, and the engine 1 attempts to make the positive rotation relative to the sun gear 5. Accordingly, when the SOWC 17 is controlled to be in the engaged state, the above-described strut 26 is interposed (meshed) between the housing section 28 of the first clutch plate 24 and the pocket 29 of the second clutch plate 25, and thus the sun gear 5 and the engine 1 are coupled to make integral rotation in the positive rotational direction. As a result, since the two rotary elements are integrated, the entire power split mechanism 4 rotates integrally. In other words, the engine 1 is directly connected to the output gear 8.

Noted that, in the configuration shown in FIG. 10, the first motor 2 is coupled to the first clutch plate 24 of the SOWC 17, and the rotational speed of the first clutch plate 24 is controlled by the first motor 2. Meanwhile, in the above-described configuration shown in FIG. 1, the first motor 2 is coupled to the second clutch plate 25 of the SOWC 17, and the rotational speed of the second clutch plate 25 is controlled by the first motor 2. In addition, in the above-described configuration shown in FIG. 3, the first motor 2 is coupled to the second clutch plate 25 of the SOWC 17 via the overdrive mechanism 19, and the rotational speed of the second clutch plate 25 is controlled by the first motor 2. As described above, the first motor 2 is configured that it can control the rotational speed of one clutch member of either the first clutch plate 24 or the second clutch plate 25 of the SOWC 17, and is an example of the motor of the invention.

Furthermore, the invention can be applied to a control device for a power transmission mechanism that includes a stepped transmission or a continuously variable transmission other than the power transmission mechanism that is installed in the hybrid vehicle Ve as described above. Thus, the motor in the invention may be a motor for controlling the SOWC only.

What is claimed is:

1. A control system for a vehicle, the control system comprising:

a selectable one-way clutch including
- a first clutch member,
- a second clutch member, the first clutch member and the second clutch member are rotatable relative to each other,
- a strut configured to be operated such that a part of the strut projects from the first clutch member to the second clutch member,
- a switching mechanism configured to selectively set a first state or a second state, the first state being a state in which a projecting operation is permitted, the projecting operation being an operation in which the part of the strut projects from the first clutch member to the second clutch member, and the second state being a state in which the projecting operation is inhibited,
- wherein, the first state is a state in which the part of the strut projects from the first clutch member to the second clutch member and engages with a part of the second clutch member so that a relative rotation between the first and second clutch members in one of a positive rotational direction or a reverse rotational direction of the selectable one-way clutch is restricted, and the second state is a state in which the operation of the part of the strut that projects from the first clutch member to the second clutch member is inhibited so that the relative rotation in both of the positive rotational direction and the reverse rotational direction of the selectable one-way clutch is permitted;

a motor configured to control a rotational speed of one of the first and second clutch members; and an electronic control unit configured to
- (i) execute rotation control to control the motor such that a negative differential rotation changes into a positive differential rotation when the selectable one-way clutch is switched from the second state to the first state while the differential rotation is negative, and
- (ii) initiate engagement control to set the first state by the switching mechanism such that the projecting operation is completed while the differential rotation is negative.

2. The control system according to claim 1, wherein a first target differential rotation is set as a target value of the differential rotation at a point when the projecting operation is completed in the case where the engagement control is executed, a second target differential rotation is set as a threshold of the differential rotation that is used to determine initiation timing of the engagement control such that the projecting operation is completed when the differential rotation reaches the first target differential rotation, and the electronic control unit is configured to initiate the engagement control when the differential rotation is equal to or higher than the second target differential rotation.

3. The control system according to claim 2, wherein the electronic control unit is configured to control the motor such that a speed of change of the differential rotation in the rotation control reduces when current differential rotation is higher than the second target differential rotation.

4. The control system according to claim 2, wherein the electronic control unit is configured to control the motor such that a speed of change of the differential rotation in the rotation control reduces when the projecting operation is not completed while the differential rotation reaches the first target differential rotation during execution of the rotation control and the engagement control.

5. The control system according to claim 1, wherein in the case where the electronic control unit makes an engagement determination to switch the selectable one-way clutch from the second state to the first state, the electronic control unit is configured to initiate the engagement control after the electronic control unit makes the engagement determination.

6. The control system according to claim 5, wherein a first target differential rotation is set as a target value of the differential rotation at a point of time when the projecting operation is completed in the case where the engagement control is executed, and the electronic control unit is configured to control the motor such that a speed of change of the differential rotation in the rotation control reduces when the projecting operation is not completed while the differential rotation reaches the first target differential rotation during execution of the rotation control and the engagement control.

7. The control system according to claim 1, further comprising:

an internal combustion engine; and a power transmission mechanism, wherein the power transmission mechanism has a fixed section and a first differential mechanism, the fixed section is configured such that i) one of the first clutch member and the second clutch member is coupled to the fixed section and ii) the fixed section does not rotate or move, the first differential mechanism has a first rotary element, a second rotary element, and a third rotary element, the first rotary element, the second rotary element, and the third rotary element are configured to perform a differential action with respect to each other, the internal combustion engine is coupled to the first rotary element, the motor and the other one of the first clutch member and the second clutch member are coupled to the second rotary element, and the first differential mechanism is configured to output torque from the third rotary element.

8. The control system according to claim 1, further comprising:

an internal combustion engine; and a power transmission mechanism, wherein the power transmission mechanism has a fixed section, a first differential mechanism, and a second differential mechanism, the fixed section is configured such that i) one of the first clutch member and the second clutch member is coupled to the fixed section and ii) the fixed section does not rotate or move, the first differential mechanism has a first rotary element, a second rotary element, and a third rotary element, the first rotary element, the second rotary element, and the third rotary element are configured to perform a differential action with respect to each other, the internal combustion engine is coupled to the first rotary element, the motor is coupled to the second rotary element, the first differential mechanism is configured to output torque from the third rotary element, the second differential mechanism has a fourth rotary element, a fifth rotary element, and a sixth rotary element, and the fourth rotary element, the fifth rotary element, and the sixth rotary element are configured such that i) the fourth rotary element, the fifth rotary element, and the sixth rotary element perform the differential action with respect to each other, ii) the first rotary element is coupled to the fourth rotary element, iii) the second rotary element is coupled to the fifth rotary element, and iv) the other one of the first clutch member and the second clutch member is coupled to the sixth rotary element.

* * * * *